(12) United States Patent
Falter et al.

(10) Patent No.: US 11,934,847 B2
(45) Date of Patent: *Mar. 19, 2024

(54) SYSTEM FOR DATA AGGREGATION AND ANALYSIS OF DATA FROM A PLURALITY OF DATA SOURCES

(71) Applicant: Palantir Technologies Inc., Denver, CO (US)

(72) Inventors: Kelsey Falter, New York, NY (US); Joy Tao, New York, NY (US); Taylor Stearns, New York, NY (US); Tiffany Hsu, New York, NY (US); Barry McCardel, New York, NY (US); Mark Schafer, New York, NY (US); Andrew Bonventre, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/474,986

(22) Filed: Sep. 14, 2021

(65) Prior Publication Data

US 2021/0406045 A1     Dec. 30, 2021

Related U.S. Application Data

(63) Continuation of application No. 15/235,558, filed on Aug. 12, 2016, now Pat. No. 11,150,917.

(Continued)

(51) Int. Cl.
*G06F 9/451* (2018.01)
*G06F 8/36* (2018.01)
(Continued)

(52) U.S. Cl.
CPC .............. *G06F 9/451* (2018.02); *G06F 9/543* (2013.01); *G06F 16/215* (2019.01); *G06F 8/36* (2013.01)

(58) Field of Classification Search
CPC ................................ G06F 9/451; G06F 9/543
See application file for complete search history.

(56) References Cited

U.S. PATENT DOCUMENTS

| 5,109,399 A | 4/1992 | Thompson |
| 5,329,108 A | 7/1994 | Lamoure |

(Continued)

FOREIGN PATENT DOCUMENTS

| CN | 102546446 | 7/2012 |
| CN | 103167093 | 6/2013 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Kevin L Young
*Assistant Examiner* — Carina Yun
(74) *Attorney, Agent, or Firm* — Knobbe, Martens, Olson & Bear, LLP

(57) ABSTRACT

An interactive user interface for receiving and displaying data is described. The interactive user interface may display data sets from a plurality of external applications and/or data sources. Received data sets may be compiled to form an interactive graphical unit, also called a "card," that may be displayed in a format based upon that of the native external application of the received data sets. Cards may be grouped with other cards. A card may include a link which allows users to access the native external application of the card to make any desired modifications or changes.

20 Claims, 13 Drawing Sheets

Related U.S. Application Data

(60) Provisional application No. 62/210,296, filed on Aug. 26, 2015.

(51) Int. Cl.
*G06F 9/54* (2006.01)
*G06F 16/215* (2019.01)

(56) References Cited

U.S. PATENT DOCUMENTS

| | | |
|---|---|---|
| 5,632,009 A | 5/1997 | Rao et al. |
| 5,670,987 A | 9/1997 | Doi et al. |
| 5,729,745 A | 3/1998 | Reina et al. |
| 5,781,704 A | 7/1998 | Rossmo |
| 5,798,769 A | 8/1998 | Chiu et al. |
| 5,845,300 A | 12/1998 | Comer |
| 5,933,597 A | 8/1999 | Hogan |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,356,285 B1 | 3/2002 | Burkwald et al. |
| 6,366,933 B1 | 4/2002 | Ball et al. |
| 6,369,835 B1 | 4/2002 | Lin |
| 6,430,305 B1 | 8/2002 | Decker |
| 6,456,997 B1 | 9/2002 | Shukla |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,674,434 B1 | 1/2004 | Chojnacki et al. |
| 6,714,936 B1 | 3/2004 | Nevin, III |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 6/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 6/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,291,490 B1 | 10/2012 | Ahmed et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,365,079 B2 | 1/2013 | Kenna et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,528,061 B1 | 9/2013 | Davis |
| 8,554,579 B2 | 10/2013 | Tribble et al. |
| 8,554,653 B2 | 10/2013 | Falkenborg et al. |
| 8,554,709 B2 | 10/2013 | Goodson et al. |

(56) References Cited

U.S. PATENT DOCUMENTS

| | | |
|---|---|---|
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 8,949,164 B1 | 2/2015 | Mohler |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,100,428 B1 | 8/2015 | Visbal |
| 9,116,975 B2 | 8/2015 | Shankar et al. |
| 9,268,615 B2 | 2/2016 | Calsyn et al. |
| 9,767,172 B2 | 9/2017 | Fackler et al. |
| 11,150,917 B2 | 10/2021 | Falter et al. |
| 2002/0029269 A1 | 3/2002 | McCarty et al. |
| 2002/0033848 A1 | 3/2002 | Sciammarella et al. |
| 2002/0065708 A1 | 5/2002 | Senay et al. |
| 2002/0070965 A1 | 6/2002 | Austin |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0039948 A1 | 2/2003 | Donahue |
| 2003/0079051 A1* | 4/2003 | Moses ............... G06F 9/454 715/741 |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2003/0227461 A1 | 12/2003 | Hux et al. |
| 2003/0229848 A1 | 12/2003 | Arend et al. |
| 2004/0021695 A1* | 2/2004 | Sauermann ......... G06F 3/04847 715/786 |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | McPherson et al. |
| 2004/0193600 A1 | 9/2004 | Kaasten et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0193324 A1 | 9/2005 | Purple |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0053194 A1 | 3/2006 | Schneider et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0093222 A1 | 5/2006 | Saffer et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0150369 A1 | 6/2007 | Zivin |
| 2007/0156673 A1 | 7/2007 | Maga |
| 2007/0174760 A1 | 7/2007 | Chamberlain et al. |
| 2007/0185867 A1 | 8/2007 | Maga |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0244990 A1 | 10/2007 | Wells |
| 2007/0266336 A1 | 11/2007 | Nojima et al. |
| 2007/0284433 A1 | 12/2007 | Domenica et al. |
| 2007/0294643 A1 | 12/2007 | Kyle |
| 2008/0036767 A1 | 2/2008 | Janzen |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0104019 A1 | 5/2008 | Nath |
| 2008/0126951 A1 | 5/2008 | Sood et al. |
| 2008/0155440 A1 | 6/2008 | Trevor et al. |

(56) References Cited

U.S. PATENT DOCUMENTS

| | | |
|---|---|---|
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0088964 A1 | 4/2009 | Schaaf et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313463 A1 | 12/2009 | Pang et al. |
| 2009/0319418 A1 | 12/2009 | Herz |
| 2010/0011282 A1 | 1/2010 | Dollard et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1* | 3/2010 | Aymeloglu ............ G06F 40/166 715/255 |
| 2010/0070845 A1 | 3/2010 | Facemire et al. |
| 2010/0070897 A1 | 3/2010 | Aymeloglu et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0262688 A1 | 10/2010 | Hussain et al. |
| 2010/0274674 A1 | 10/2010 | Roberts et al. |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074788 A1 | 3/2011 | Regan et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce et al. |
| 2011/0099133 A1 | 4/2011 | Chang et al. |
| 2011/0107241 A1 | 5/2011 | Moore |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0185316 A1 | 7/2011 | Reid et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0218955 A1 | 9/2011 | Tang |
| 2011/0219450 A1 | 9/2011 | McDougal et al. |
| 2011/0225198 A1 | 9/2011 | Edwards et al. |
| 2011/0238495 A1 | 9/2011 | Kang |
| 2011/0238553 A1 | 9/2011 | Raj et al. |
| 2011/0251951 A1 | 10/2011 | Kolkowtiz |
| 2011/0258158 A1 | 10/2011 | Resende et al. |
| 2011/0270604 A1 | 11/2011 | Qi et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0296289 A1 | 12/2011 | Tokashiki |
| 2011/0310005 A1 | 12/2011 | Chen et al. |
| 2011/0314007 A1 | 12/2011 | Dassa et al. |
| 2012/0011238 A1 | 1/2012 | Rathod |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084118 A1 | 4/2012 | Bai et al. |
| 2012/0084652 A1* | 4/2012 | Martinez Bauza .. H04N 13/128 348/E13.001 |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0203708 A1 | 8/2012 | Psota et al. |
| 2012/0208636 A1 | 8/2012 | Feige |

(56) References Cited

U.S. PATENT DOCUMENTS

| | | |
|---|---|---|
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0054306 A1 | 2/2013 | Bhalla |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097482 A1 | 4/2013 | Marantz et al. |
| 2013/0110746 A1 | 5/2013 | Ahn |
| 2013/0110822 A1 | 5/2013 | Ikeda et al. |
| 2013/0111320 A1 | 5/2013 | Campbell et al. |
| 2013/0117651 A1 | 5/2013 | Waldman et al. |
| 2013/0101159 A1 | 6/2013 | Rosen |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai |
| 2013/0232128 A1 | 9/2013 | Krishnan et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0304770 A1 | 11/2013 | Boero et al. |
| 2013/0311375 A1 | 11/2013 | Priebatsch |
| 2013/0347078 A1* | 12/2013 | Agarwal ............... H04L 63/102 709/204 |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0075004 A1 | 3/2014 | Van Dusen et al. |
| 2014/0075301 A1 | 3/2014 | Mihara |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0244388 A1 | 8/2014 | Manouchehri et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0344656 A1* | 11/2014 | Groom ............... G06F 16/44 715/202 |
| 2014/0358829 A1 | 12/2014 | Hurwitz |
| 2014/0366132 A1 | 12/2014 | Stiansen et al. |
| 2015/0019394 A1 | 1/2015 | Unser et al. |
| 2015/0046870 A1 | 2/2015 | Goldenberg et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188872 A1 | 7/2015 | White |
| 2015/0227295 A1 | 8/2015 | Meiklejohn et al. |
| 2016/0105459 A1 | 4/2016 | Esary et al. |
| 2016/0306806 A1 | 10/2016 | Fackler et al. |
| 2017/0351686 A1 | 12/2017 | Fackler et al. |

FOREIGN PATENT DOCUMENTS

| | | |
|---|---|---|
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 1672527 | 6/2006 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |

(56) References Cited

FOREIGN PATENT DOCUMENTS

| | | |
|---|---|---|
| EP | 2869211 | 5/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911078 | 8/2015 |
| EP | 2911100 | 8/2015 |
| EP | 3107014 | 12/2016 |
| EP | 3144810 | 3/2017 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/009529 | 2/2000 |
| WO | WO 02/065353 | 8/2002 |
| WO | WO 2005/104736 | 11/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, pp. 2.
"A Word About Banks and the Laundering of Drug Money," Aug. 18, 2012, http://www.golemxiv.co.uk/2012/08/a-word-about-banks-and-the-laundering-of-drug-money/.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container retrieved on May 18, 2015.
"The FASTA Program Package," fasta-36.3.4, Mar. 25, 2011, pp. 29, [Uploaded in 2 Parts].
Acklen, Laura, "Absolute Beginner's Guide to Microsoft Word 2003," Dec. 24, 2003, pp. 15-18, 34-41, 308-316.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Appacts, "Smart Thinking for Super Apps," http://www.appacts.com Printed Jul. 18, 2013 in 4 pages.
Apsalar, "Data Powered Mobile Advertising," "Free Mobile App Analytics" and various analytics related screen shots http://apsalar.com Printed Jul. 18, 2013 in 8 pages.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Capptain—Pilot Your Apps, http://www.capptain.com Printed Jul. 18, 2013 in 6 pages.
Celik, Tantek, "Css Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Cohn, et al., "Semi-supervised clustering with user feedback," Constrained Clustering: Advances in Algorithms, Theory, and Applications 4.1 (2003): 17-32.
Conner, Nancy, "Google Apps: The Missing Manual," May 1, 2008, pp. 15.
Countly Mobile Analytics, http://count.ly/ Printed Jul. 18, 2013 in 9 pages.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
DISTIMO—App Analytics, http://www.distimo.com/app-analytics Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Faulkner, Steve "Notes on Accessibility of Text Replacement Using HTML5 Canvas;" Jun. 9, 2009; The Paciello Group; pp. 1-4.
Flurry Analytics, http://www.flurry.com/ Printed Jul. 18, 2013 in 14 pages.
GIS-NET 3 Public_Department of Regional Planning. Planning & Zoning Information for UNINCORPORATED LA County. Retrieved Oct. 2, 2013 from http://gis.planning.lacounty.gov/GIS-NET3_Public/Viewer.html.
Google Analytics Official Website—Web Analytics & Reporting, http://www.google.com/analytics.index.html Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News On Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.

(56) References Cited

OTHER PUBLICATIONS

Huff, David L., "Parameter Estimation in the Huff Model," ESRI, ArcUser, Oct.-Dec. 2003, pp. 34-36.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, http://www.kontagent.com/ Printed Jul. 18, 2013 in 9 pages.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, http://www.localytics.com/ Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mixpanel—Mobile Analytics, https://mixpanel.com/ Printed Jul. 18, 2013 in 13 pages.
Mizrachi, Ilene, "Chapter 1: GenBank: The Nuckeotide Sequence Database," The NCBI Handbook, Oct. 2002, pp. 1-14.
Mozilla Support: "Applications panel—Set how Firefox handles different types of files",, Jun. 4, 2015, Retrieved from the Internet: URL: https://web.archive.org/web/20150604001024/support.mozilla.org/en-US/kb/applications-panel-set-how-firefox-handles-files [retrieved on Jul. 13, 2018].
Nierman, "Evaluating Structural Similarity in XML Documents", 6 pages, 2002.
Notice of Acceptance for Australian Patent Application No. 2014250678 dated Oct. 7, 2015.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/319,161 dated May 4, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/479,863 dated Mar. 31, 2015.
Notice of Allowance for U.S. Appl. No. 14/504,103 dated May 18, 2015.
Notice of Allowance for U.S. Appl. No. 14/616,080 dated Apr. 2, 2015.
Notice of Allowance for U.S. Appl. No. 14/874,303 dated May 26, 2017.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14199182.8 dated Mar. 13, 2015.
Official Communication for European Patent Application No. 14200298.9 dated May 13, 2015.

(56) References Cited

OTHER PUBLICATIONS

Official Communication for European Patent Application No. 15155846.7 dated Jul. 8, 2015.
Official Communication for European Patent Application No. 15181419.1 dated Sep. 29, 2015.
Official Communication for European Patent Application No. 16174638.3 dated Jul. 20, 2018.
Official Communication for European Patent Application No. 16174638.3 dated Oct. 5, 2016.
Official Communication for European Patent Application No. 16185581.2 dated Feb. 17, 2017.
Official Communication for European Patent Application No. 16185581.2 dated Oct. 30, 2019.
Official Communication for Great Britain Patent Application No. 1404457.2 dated Aug. 14, 2014.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2013306 dated Apr. 24, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.

(56) References Cited

OTHER PUBLICATIONS

Official Communication for U.S. Appl. No. 14/306,154 dated May 15, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,161 dated Jan. 23, 2015.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/473,552 dated Feb. 24, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/552,336 dated Jul. 20, 2015.
Official Communication for U.S. Appl. No. 14/562,524 dated Sep. 14, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/631,633 dated Sep. 10, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/676,621 dated Jul. 30, 2015.
Official Communication for U.S. Appl. No. 14/726,353 dated Sep. 10, 2015.
Official Communication for U.S. Appl. No. 14/746,671 dated Sep. 28, 2015.
Official Communication for U.S. Appl. No. 14/813,749 dated Sep. 28, 2015.
Official Communication for U.S. Appl. No. 14/874,303 dated Feb. 13, 2017.
Official Communication for U.S. Appl. No. 14/874,303 dated Mar. 30, 2017.
Official Communication for U.S. Appl. No. 15/684,591 dated Jun. 21, 2018.
Official Communication for U.S. Appl. No. 15/684,591 dated Mar. 11, 2019.
Official Communication for U.S. Appl. No. 15/684,591 dated Jul. 12, 2019.
Official Communication for U.S. Appl. No. 15/684,591 dated Nov. 5, 2018.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Open Web Analytics (OWA), http://www.openwebanalytics.com/ Printed Jul. 19, 2013 in 5 pages.
Palmas et al., "An Edge-Bunding Layout for Interactive Parallel Coordinates" 2014 IEEE Pacific Visualization Symposium, pp. 57-64.
Piwik—Free Web Analytics Software. http://piwik.org/ Printed Jul. 19, 2013 in18 pages.
Rouse, Margaret, "OLAP Cube," http://searchdatamanagement.techtarget.com/definition/OLAP-cube, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
StatCounter—Free Invisible Web Tracker, Hit Counter and Web Stats, http://statcounter.com/ Printed Jul. 19, 2013 in 17 pages.
TestFlight—Beta Testing On The Fly, http://testflightapp.com/ Printed Jul. 18, 2013 in 3 pages.
Thompson, Mick, "Getting Started with GEO," Getting Started with GEO, Jul. 26, 2011.
Trak.io, http://trak.io/ printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
UserMetrix, http://usermetrix.com/android-analytics printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353.
Wang et al., "Research on a Clustering Data De-Duplication Mechanism Based on Bloom Filter," IEEE 2010, 5 pages.
Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML Page Analysis Based on Visual Cues", A129, pp. 859-864, 2001.

* cited by examiner

CARDS 200

| Title | Owned by anyone ▼ | Last Modified |
|---|---|---|
| Meatsnacks for realz   9 Cards | J. Doe | 9 days ago |
| Product Attribute and Preliminary Predictive Mod... 18 Cards | J. Doe | 16 days ago |
| Presentation: Meat Snack Analysis   38 Cards | J. Doe | 16 days ago |
| Snack bar trends   35 Cards | J. Doe | 21 days ago |
| Promo Trends for Snack Bars   10 Cards | J. Doe | 21 days ago |
| Power Bars   20 Cards | J. Doe | 21 days ago |
| Case Study Template   11 Cards | J. Doe | 21 days ago |
| Meat Snack Analysis--2   36 Cards | J. Doe | 21 days ago |

🔍 Search...   ⊕ New Story

FIG. 2

SYSTEM FOR DATA AGGREGATION AND ANALYSIS OF DATA FROM A PLURALITY OF DATA SOURCES

PRIORITY CLAIMS TO RELATED APPLICATIONS

The present application is a continuation of U.S. patent application Ser. No. 15/235,558, filed Aug. 12, 2016 entitled "System for data aggregation and analysis of data from a plurality of data sources," which claims benefit of priority to U.S. Provisional Patent Application No. 62/210,296, filed Aug. 26, 2015. The disclosures of each of the aforementioned applications are incorporated herein in their entirety for all purposes.

TECHNICAL FIELD

The present disclosure relates to systems and techniques for aggregating, modifying, and displaying data in an interactive user interface.

BACKGROUND

A variety of analytical platforms exist for creating and/or editing representations of data. Such representations of data may be referred to as "artifacts." For example, an artifact may be a histogram, line chart (e.g., time series), heatmap, bar chart, etc. Such artifacts may be useful for providing graphical representations of data such as statistics, readouts from a computer, etc.

In some cases, a user may wish to output artifacts from an analytical platform. For example, the user may wish to present analytical findings to consumers, colleagues, etc. The user may also wish to present the artifact together with other data, including other artifacts. However, it may be difficult to output artifacts in a dynamic, interactive format that can be made available for consumption on a variety of platforms.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for receiving and displaying data in interactive user interfaces. In some embodiments, the interactive user interfaces may display data sets from a plurality of external applications and/or data sources. The data corresponding to the data sets may include graphs (as described below), interactive objects, images, documents, and/or other types of data. A collection of data sets to be displayed on the interactive user interface may be referred to as "card data." External applications may also be referred to herein as "source applications."

In some embodiments, card data may comprise one or data items to be displayed from the plurality of external applications and/or data sources. A displayed unit based on card data may be referred to as a "card." In some embodiments, card data may comprise display parameters specifying the data to be displayed by a card, and also how the data is to be displayed. Card data may be comprised of one or more "card data items" that may specify individual components of the card data. For example, for a card displaying a bar graph, one card data item may define a color scheme for the card, another may define a title for the card, etc. Card data may also include information about a card, such as tracked modifications to a card, date of creation, etc.

Card data may be retrieved from external applications. In some embodiments, retrieved card data may be displayed as a card in a format based upon that of their native external application. That is, the displayed card may look like the artifact which the card data was derived from. However, in an embodiment, the derived card data may not include all of the data related to the artifact used by the native external application. For example, card data may include only data necessary for displaying a card and may not include data that is only necessary for manipulating or changing card data. That is, the card may look like the artifact, but may not be manipulated or changed in the way the artifact could be at the external application. The card may include a link which allows users to access the external application to make any desired modifications or changes. In alternative embodiments, data related to manipulating or changing the data may be included in the card data. For example, the card data may be displayed in an interactive format, allowing the user to change or manipulate the data in a manner that would be possible in the data's native application. For example, the card may correspond to an artifact, wherein data for the artifact comprises one or more time-series graphs retrieved from a graph application. The user may be able to perform manipulations on the displayed graphs using the interactive user interface that correspond to manipulations that the user would have been able to perform using the graph application (e.g., zooming or scrolling through a graph, setting markers on a graph, associating events with data points in a graph, and/or the like).

The systems and methods described herein may provide several benefits. For example, the systems and methods described herein may allow the user to more easily gather and aggregate data from various different sources while maintaining an ability to access the various sources. By allowing the user to specify, view, and interact with different types of data from different sources in a single interface, the user may be able to better gather information, identify trends or correlations, and form a more complete picture of a topic or entity of interest. For example, a user may specify for display one or more graphs containing sensor data associated with an entity of interest during a time period of interest and associate it with a display of a similar graph from a different entity, thus providing an improved ability to compare the two. In addition, the user may be able to easily export and/or share such data and access the sources of the data to modify and/or build on the analytical findings. As such, the user to able to more quickly and accurately access, navigate, assess, and digest the data than previous systems, potentially providing reduced mental workloads, improved decision-making, reduced work stress, and/or the like, for the user.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, graph data, image data, and/or other data, and may enable a user to more quickly and accurately access, navigate, assess, and digest the data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, images, graphs, and other types of data), translation and delivery of those inputs to various system components, automatic and dynamic execution of complex processes in response to the input delivery, automatic interaction among various components and processes of the system, and automatic and dynamic updating of the user interfaces (to, for example, display the relevant data from various different applications and/or data sources). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data aggregation and analysis technology is limited in various ways (e.g., limited in the types of applications or data sources the data may be drawn from, loss of data interactivity, etc.), and various embodiments of the disclosure provide significant improvements over such technology. Additionally, various embodiments of the present disclosure are inextricably tied to computer technology. In particular, various embodiments rely on detection of user inputs via graphical user interfaces, aggregation of data from different applications and data sources, and automatic processing, formatting, and display of the aggregated data via interactive graphical user interfaces. Such features and others (e.g., automatically determining an application or data source an inputted link is directed to, accessing the application or data source to retrieve and display the requested data, implementing interactivity of displayed data reflective of how the data would be displayed in its native application) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

BRIEF DESCRIPTION OF THE DRAWINGS

FIG. 2 illustrates an example interactive graphical user interface of the cards application, including multiple user-selectable "stories."

DETAILED DESCRIPTION OF SPECIFIC EMBODIMENTS

Overview

As described above, it may be difficult to output analytical representations of data (e.g., histograms, line charts, heatmaps, bar charts, etc.) in a dynamic, interactive format that can be made available for consumption on a variety of platforms. In other words, the ability to share analysis may be inhibited by a lack of a canonical, self-contained unit of insight capable of effectively sharing analysis results. For example, analysis results may typically be presented using PowerPoint/Keynote presentations, e-mails, and/or hardcopy documents passed around at meetings. However, such presentation methods may be ineffective for busy, on-the-go consumers and/or may not provide abilities for interaction with the presentation materials.

Accordingly, disclosed herein are various systems and methods for providing a platform-agnostic, self-contained unit of content for sharing analysis results and insights in an interactive user interface. Such systems and methods may provide a flexible Application Programming Interface (API) that allows users to develop a format for mapping analytical findings to an output that is effective for consumption as well as for providing attribution and/or other information for the analytical findings. For example, a computing device (e.g., the computing system 900 of FIG. 9 described below) may be configured to retrieve data from one or more external applications and display the retrieved data in one or more interactive graphical unit, which may be referred to herein as "cards." The set of data associated with a card, and upon which a card is based (e.g., the retrieved data from the one or more applications) may be referred to herein as a set of "card data" and/or "card data items." A set of card data items may be composed of various data items (including various properties, and/or metadata) which define the features of the card. For example, such card data may include a unique identifier (ID), Access Control List (ACL) or other permissions, title, author, time/date of creation and/or most recent edit, time/date of data update, tags, creation path, source of data, type of card, link to other card or application, card details, footnote, etc. The card may be interactive in that a user may manipulate individual cards data items associated with the card, as well as be able to access the original source (e.g., the external application) of the data displayed in the card. A card may be created by a card software application, hereinafter referred to as a "cards application," or "target application."

Figure 1:
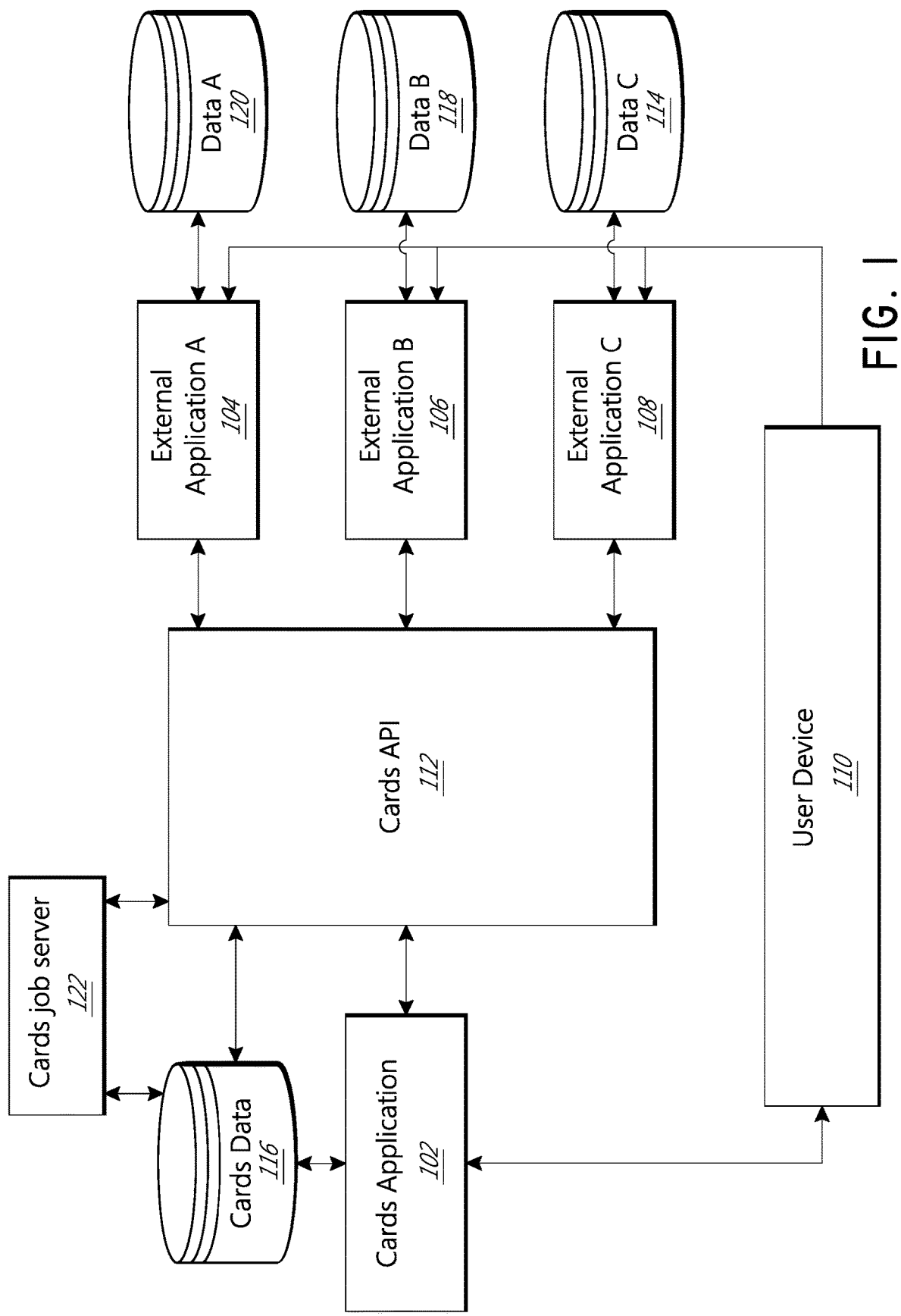
FIG. 1 illustrates a system diagram illustrating how a cards application communicates with other applications and/or data sources to retrieve data.

FIG. 1 illustrates a system diagram illustrating how a cards application communicates with other applications and/or data sources to retrieve data, in accordance with some embodiments. A user may access a cards application 102 and a variety of other (e.g., external) applications 104, 106, 108 via a user device 110. The user device 110 may be any computing device capable of accessing software applications, such as a smartphone, tablet, laptop computer, etc.

Figure 9:
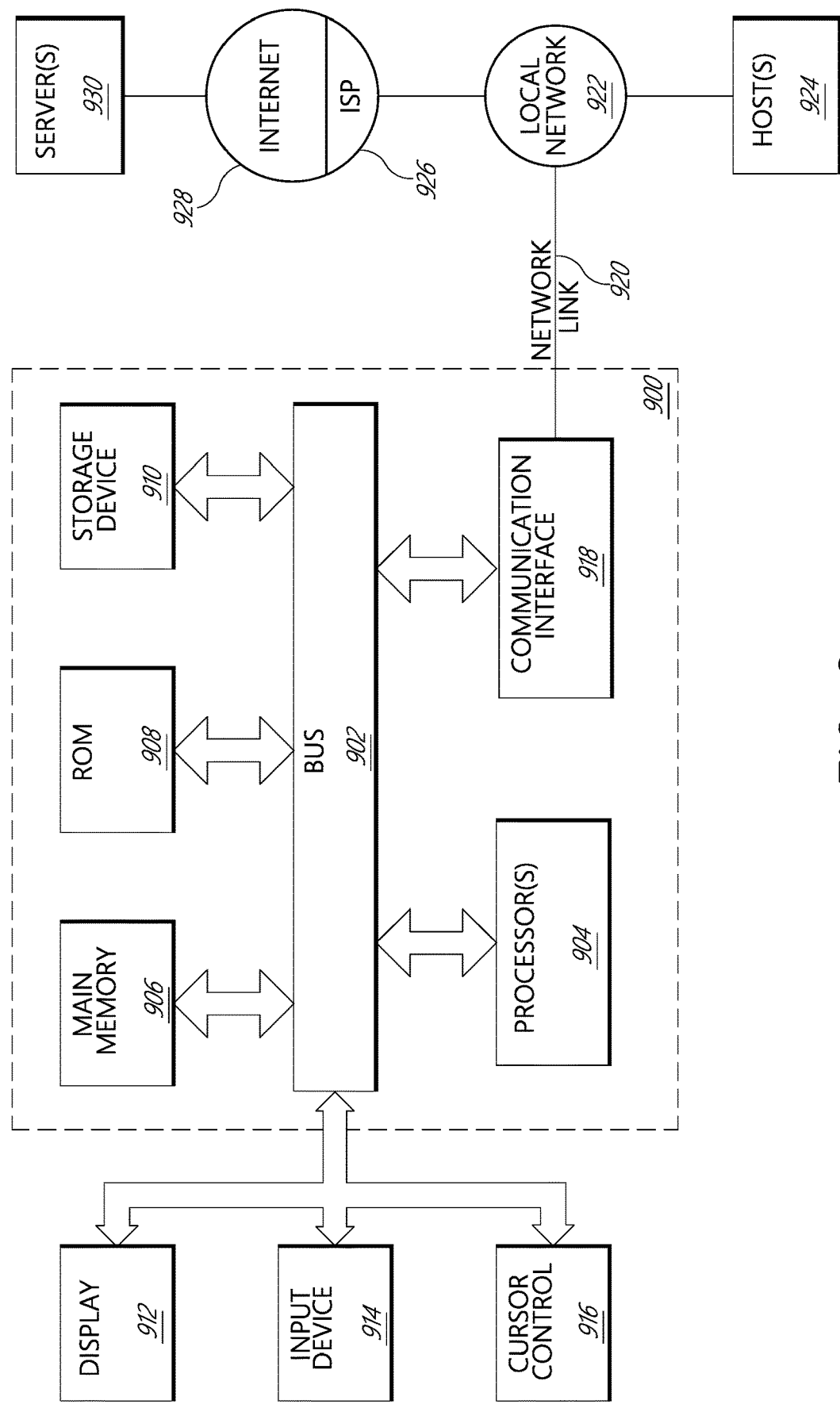
FIG. 9 illustrates a computer system with which certain methods discussed herein may be implemented, according to various embodiments.

One or more applications may be run on various computing devices, such as user device 110. For example, cards application 102 and external applications 104, 106, and 108 may be run on the user device 110. Applications may also be run on different devices. For example, cards application 102 and each of external applications 104, 106, and 108 may each be run on separate computing devices. FIG. 9 illustrates an exemplary computing device (e.g., user device 110) which may be used to run one or more applications. While FIG. 1 illustrates three external applications 104, 106, and 108, this is only exemplary and more or fewer applications may be used.

Cards application 102 and/or external applications 104, 106, and 108 may generate user interface data that may be transmitted to the user device 110. The user interface data may be transmitted in a form suitable for display by the user device 110 and/or may be suitable for being rendered (e.g., via a web browser) at the user device 110. The user device 110 may communicate with the cards application 102 and/or external applications 104, 106, and 108 over wired or wireless connections and/or over the internet. The various devices in FIG. 1 may be locally or remotely connected.

Cards application 102 may communicate with external applications 104, 106, and 108 (e.g., analytical platforms) via an Application Programming Interface (API) 112 (referred to herein as "cards API 112"). The cards API 112 may be a flexible API. For example, a user may access an external application 108 to create a graphical representation of data (e.g., an artifact), such as a bar graph). To create the bar graph, the external application 108 may access data stored in a database 114. The database 114 may contain data such as graphical representations (e.g., tools for creating a bar graph) and data to be represented (e.g., in the bar graph). After completing the bar graph, the user may wish to output the graph to a platform to make it available to consumers, colleagues, etc. The user may select a link that instructs the external application 108 to perform an API call to the cards API 112. In one example, the external application 108 may access the API 112 via a plug-in or extension. The cards API 112 may receive data representative of the graph and may perform a variety of functions to make the received data suitable for use by the cards application 102 and/or add features to the received data for improved consumption. The cards application 102 may receive the data representative of the graph and may create card data representative of the modified bar graph and any additional features added by the cards API. The cards application 102 may store the card data in a database 116 and may display the card data as a card. As further illustrated in FIG. 1, the cards API 112 may communicate direct with the database 116 to, for example, service API calls via the cards API 112.

FIG. 1 further illustrates a cards job server 122. The cards job server 122 may communicate with the database 116 and the cards API 112 to perform, for example, various backend functions. For example, as described here, in some implementations cards (e.g., data underlying a card) may be automatically updated (e.g., periodically, on a schedule, upon a user's request, or otherwise). In these implementations, the cards job server 122 may run a job that, for example, may access and update data via API calls of the cards API 112. For example, a user may specify an update job as follows: "I would like the data in this card to be updated on X frequency." In this example, the jobs server 122 will execute a job with the specified frequency to update the data related to the specified card, for example, accessing data from a data-provider application (e.g., any external data source; external applications 104, 106, 108; databases 114, 118, 120; etc.) if the application/data is not available on the user's local machine.

As used herein, the term "database" may include, without limitation, other data structures such as comma separated values (CSV) files, eXtendible markup language (XML) files, TeXT (TXT) files, flat files, spreadsheet files, and/or any other widely used or proprietary format for data storage. Furthermore, a database may be any data store or data structure (and/or combination of multiple data stores, data structures, and/or databases) for storing data. For example, suitable databases may include a relational database management system (RDBMS), a structured query language (SQL) or non SQL (NoSQL) database, etc.

Communication between the cards application 102 and the external applications 104, 106, 108 may be bi-directional. For example, a user viewing the modified bar graph card via the cards application 102 may wish to access the original bar graph. The user may select an attribution derivation link embedded in the card that performs a call to the cards API 112. The cards API 112 may receive the card data representative of the bar graph from the cards application 102 and route the user device 110 to the external application 108 where the graph was created. The external application 108 may access data corresponding to the original graph from the database 114 and present it to the user.

Card data and/or card data items may be associated with permissions. For example, a card data item may provide an Access Control List (ACL) that defines which users may access the card data and/or view the card associated with the card data. The defined users may be on an individual basis or may be based on a class (e.g., employees of a company).

Moreover, individual card data items may be associated with permissions. For example, a card data item may define a card's title. The author of the card may associate a permission with the title to allow only certain users accessing the card to be able to change the title.

The cards application 102 may organize cards into different analysis narratives, referred to herein as "stories" or groups of interactive graphical units. Each card in a story may provide an atomic unit of content that may be combined with other related cards in a larger presentation. For example, a story directed to consumption of a certain product may include multiple cards, with each card illustrating consumption of the product by a different demographic group and/or over a different time period.

FIG. 2 illustrates an example interactive graphical user interface of the cards application, including multiple user-selectable stories, in accordance with some embodiments. As shown in FIG. 2, each story 202 may have one or more identifiers, such as a title 204, an owner 206 (if any), and a date/time of a most recent modification 208. Each story 202 may also have a card number indicator 210 to indicate how many cards are contained in the story 202. A user may perform a search 212 of the stories using any story identifier. Stories 202 may also be sorted by any identifier (e.g., owner 206) and/or other data item (e.g., number of cards). The interface 200 also includes a new story link 214 to allow a user to create a new story. Each story 202 in the interface may be selected to direct a user to an interface providing further detail regarding the selected story 202. A story 202 may have an associated ACL to control which users are able to access the story 202.

Figure 3A:
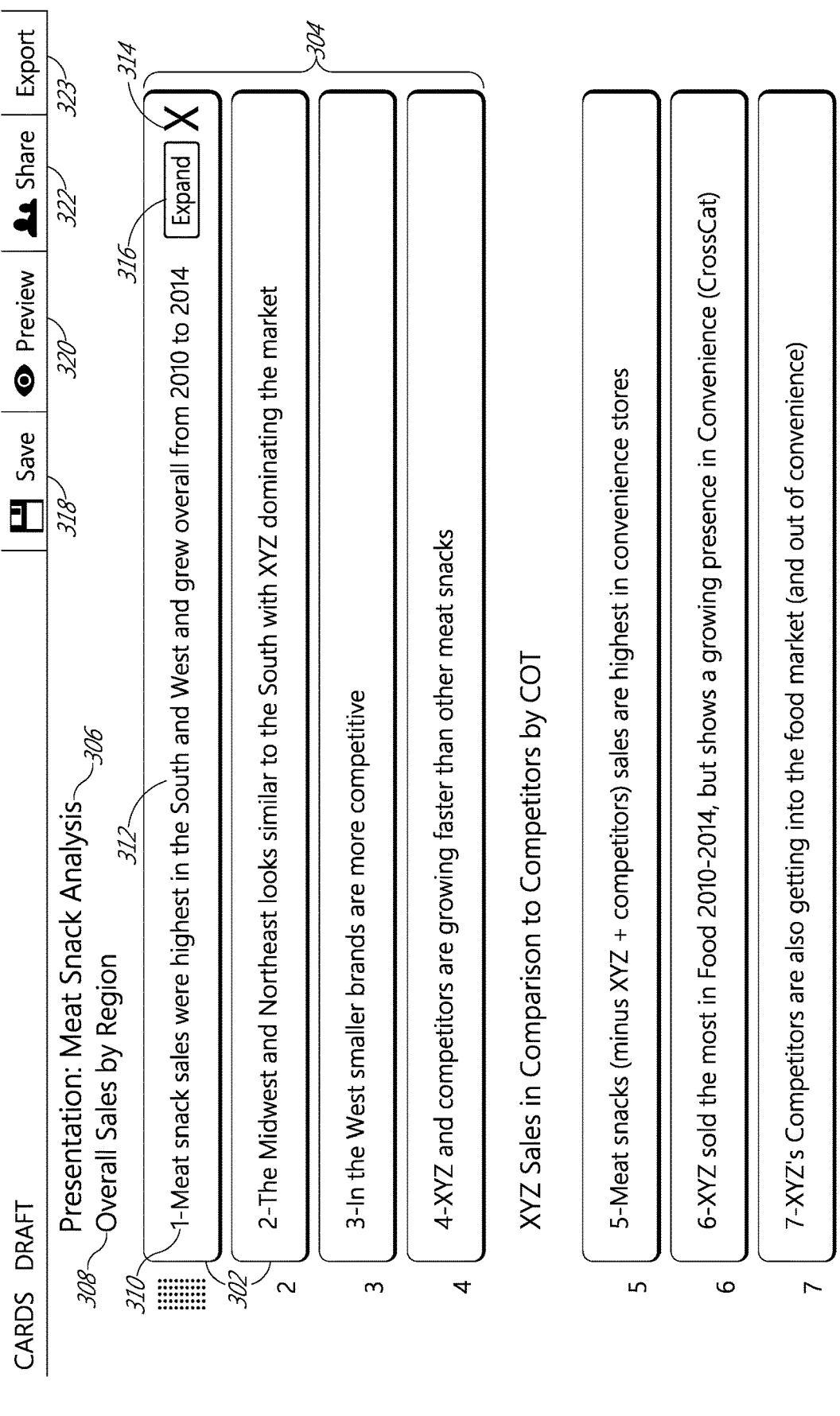
FIGS. 3A-3C illustrate example interactive graphical user interfaces of the cards application, including a display of "cards" within a selected "story."

FIG. 3A illustrates an example interactive graphical user interface of the cards application, including a display of cards within a selected story, in accordance with some embodiments. As shown in FIG. 3A, cards (e.g., cards 302) may be grouped into sections (e.g., section 304) within a story. The interface 300 includes a story title 306 and section titles (e.g., section title 308). The story and section titles may be added and/or edited by the user so as to enable the user to organize the cards in any way desired. Each card (e.g., see one of cards 302) may have an identifying number 310 and/or a title/description 312. A user may perform a variety of functions for each card, including deleting (e.g., by selection of icon 314) and expanding (e.g., by selection of button 316) a card. In an embodiment, icon 314 and/or button 316 may be displayed with respect to a card when the user hovers a mouse cursor over the card. A user may also move a card to a different section and/or position within a section, e.g., by selecting and dragging the card to the desired section. The user may, via the example interactive graphical user interface of FIG. 3A, add or delete sections from the story, and/or otherwise organize the story as desired. After making any changes to a card (e.g., changing card data associated with one of cards 302) and/or section, the user may save changes made to the story by selection of button 318. Alternatively, changes to the story, sections within the story, and/or cards may be automatically saved. The user interface of FIG. 3A also includes user-selectable elements (e.g., elements 320 and 322) by with the user may preview and/or share the story, and/or cards of the story. For example, a user may share the story and/or a card of the story with an external platform, such as Facebook, Twitter, etc., and/or may share a card with, and/or transfer a card to, a different story.

The user may also export (e.g., by selection of user-selectable element 323) the story and/or one or more cards of the story to a different platform and/or format for convenience in sharing the story with others. For example, a user may export the story to a format such as a presentation format (e.g., PowerPoint format). In such an export, the cards of the story may each be automatically be converted into slides of a presentation format, and compiled into a single presentation file. In other examples, the story may be converted into any other format suitable for a different platform. Exporting a story may also cause various card data items associated with a card and/or story to be embedded in the exported file and/or format. For example, an exported card (e.g., a card exported to a slide of a presentation file, may include attribution information at the bottom of the slide to indicate that the card was created in the cards application 102, may provide an identity of the author of the card and/or story, and/or may provide other similar information associated with the card and/or story. The exported card may also include a link back to the cards application 102 to allow the user to view the card associated with the exported card within the cards application 102.

Figure 3B:
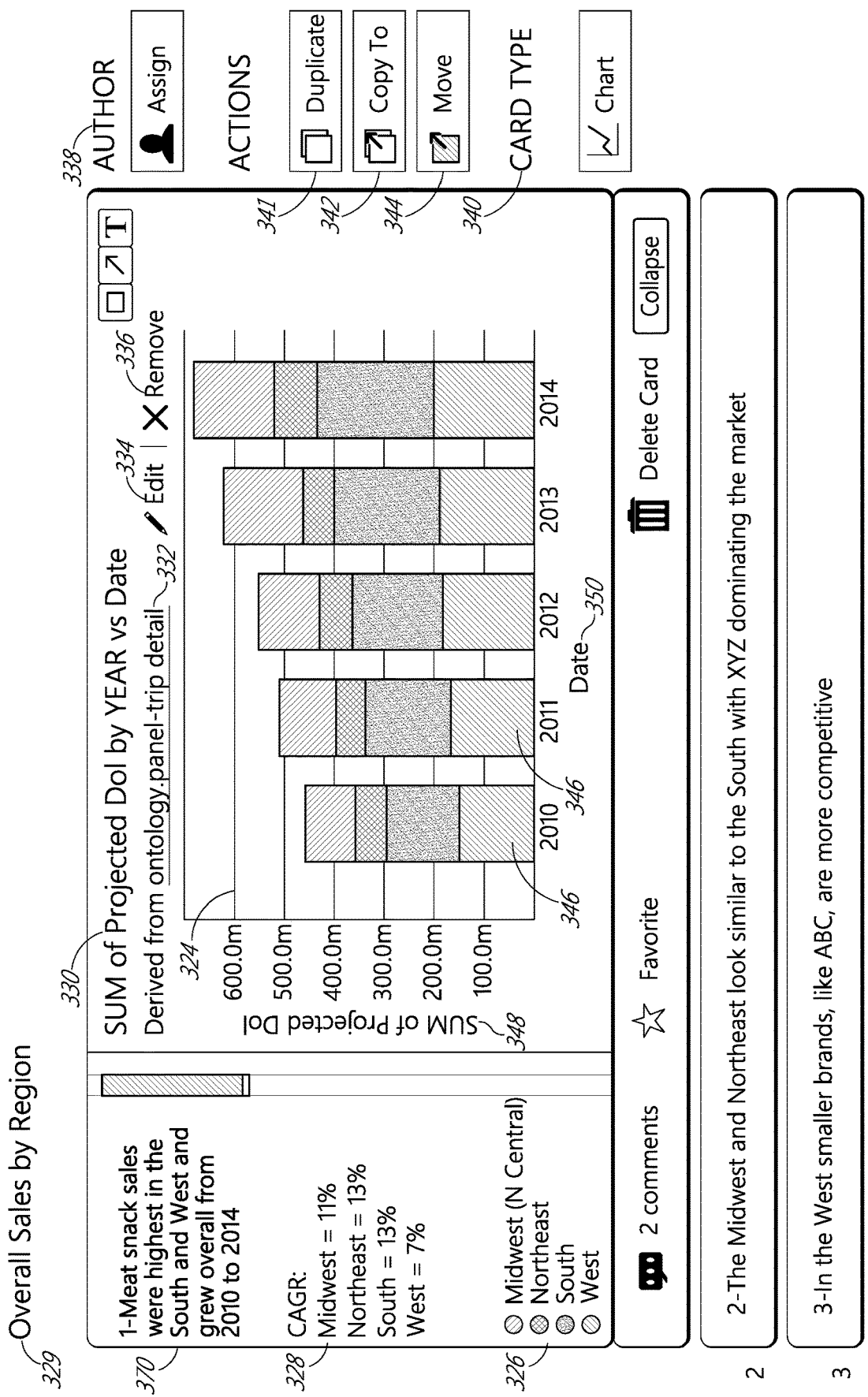

FIG. 3B illustrates the example interactive graphical user interface of FIG. 3A with an expanded view of a card, in accordance with some embodiments. The card 370 illustrated in FIG. 3B is merely one example card composed of multiple example aspects, and other cards may have any number of similar or different aspects, including aspects different from those illustrated in FIG. 3B. As shown in FIG. 3B, the example card 370 may include a display of multiple aspects, each of which may be based on a card data item, including a bar chart 324, a key 326, statistical data 328, and a title/description 329. Additionally, the card 370 may further include a display of other card data items, such as a title 330, an attribution derivation link 332, and options to edit and remove (e.g., by selection of user-selectable elements 334 and 336, respectively) the bar chart 324. Further properties may include an author 338 and card type 340. One or more of these aspects may be modified by a user. For example, a user may change the author 338 identified for the card 302. In some embodiments, various aspects may have associated permissions. For example, only users from a particular group may be allowed to modify the title/description 330 of the card 370, while user from a different (e.g., larger) group may be allowed to modify the bar chart 324. A user may also perform further actions, such as duplicating, copying, and moving (e.g., by selection of user-selectable elements 341, 342 and 344, respectively) the card 370.

As discussed, cards may be responsive to user interaction. For example, hovering or clicking on aspects of card 370 may cause more data to be shown. In an example of a line graph, such data may include values of selected data points. For pie or bar charts, such data may include breaking out the parts of a selected data point.

Additionally, a card may have an associated card ID. The ID for each card may be unique and may be associated with card data items of the card, including, for example, a date of creation, author, attribution history, ACL, artifact, and/or any other data items used in displaying the card. Card data items associated with a card, as described herein, may be stored in the database 116, and may be associated with the card ID of the card, which may also be stored in the database 116. Each component of the card ID may individually map to the card, such that a user can search card data items associated with a card ID to find a desired card. For example, a user searching cards having a particular date of creation may be provided a list of cards having an ID that includes the selected date of creation. In another example, a user may search for cards added to a particular story that were created in a particular time period selected by the user. In this way, users can effectively search stories, cards, and card data items using varying levels of specificity. As shown, such searching may apply not only to display data related to a card and/or story, but also the underlying metadata (e.g., data tracking modifications to a card).

A card ID may provide a reference point for a card. That is, by associating each card with a card ID, each card is itself an atomic unit independent of association with any particular story. Each card may be a member of multiple stories.

In an embodiment, the cards application 102 may track changes made to a card and/or card data items associated with the card. For example, if the title of the card is changed, the change may be recorded in the database 116 for the card ID associated with the card. In an embodiment, the database 116 may save multiple versions of a card. Users may also search for changes made to a card. For example, a user may search for any changes made to a card in a selected time period. For each change to a card, the user may have the option to make the update across all instances of the card ID associated with the card or generate a new card ID.

Although cards are illustrated in FIGS. 3A and 3B as having an expanded (e.g., FIG. 3B) or contracted (e.g., FIG. 3A) state viewed in a vertical sequence, cards may be presented in a variety of ways. For example, cards may be displayed in a grid having a one or more cards in one or more columns and/or rows. In the present example, cards in a grid format may be expanded and contracted. In another example, cards may be viewed in a horizontal sequence. Other methods of displaying cards are also contemplated.

In the example embodiment, the bar chart 324 is composed of five bars 346, each representing a sum of projected dollars 348 for a given year 350. The data represented in the bar chart 324 may be populated automatically. For example, the bar chart 324 may have been created by use of software that automatically populated the bar chart 324 with stored data. In another example, the bar chart 324 may be automatically updated in real-time from a source providing real-time data, such as a website. In addition to the bar chart 324, any other card data items associated with the card 370 may be updated (i.e., refreshed) automatically. Alternatively, the data represented in the bar chart 324 may be populated manually by users. For example, a user may adjust the values indicated in the statistical data 328 to adjust the values in the bar chart 324. The user may also edit (e.g., by selection of user-selectable element 334) the bar chart 324. In some embodiment, users may make adjustments directly to various card data items, including the bar chart 324.

In an embodiment, a user may not edit the bar chart 324 via the cards application 102, but may select the attribution derivation link 332 to edit the bar chart 324 using an external application. The attribution derivation link 332 may provide a link to an external application where the bar chart 324 was created. That is, by selecting the attribution derivation link 332, the user may be directed to an external application 108 (e.g., an analytical platform) and may view the analytical path for creation of the bar chart 324. For example, the link 332 may launch the external application 108 and direct the user to a view of the application 108 with pre-populated data from the database 114 related to creation of the bar chart 324, including data represented by the bar chart 324, format used for the bar chart 324, etc.

The attribution derivation link 332 is illustrated in FIG. 3B having text providing a file name of the file used to create the bar chart 324. However, the attribution derivation link 332 may alternatively comprise text providing different information. For example, the link 332 may comprise text describing how the bar chart 324 was created, such as "created having # bars, narrowed to # bars," etc.

Figure 3C:
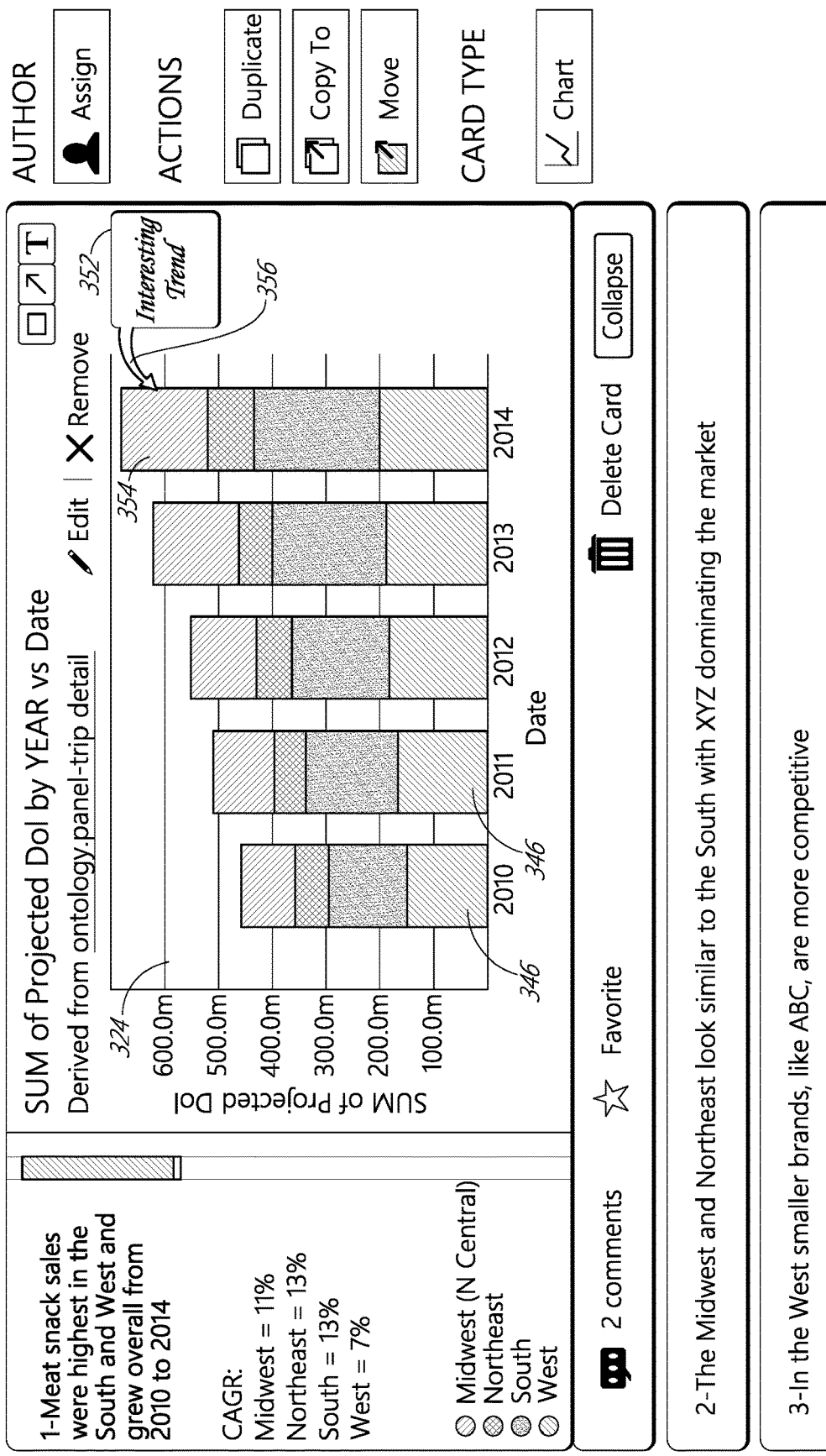

FIG. 3C illustrates the example interactive graphical user interface of FIG. 3B with an annotation 352, in accordance with some embodiments. The annotation 352 may comprise visual and/or textual cues that may be added to content to help explain, give context, and/or provide commentary. Annotations 352 may have a variety of uses, including making portions of a card 302 intelligible or interesting, and flagging parts of a card 302 as a communication to other users. For example, an annotation 352 may comprise highlighting of a portion of a card 302 or a text box, as shown in FIG. 3C.

An annotation 352 may have an "anchor" 354 that connects a cue 356 to the card 302. An anchor 354 may be a selection of data of the card 302 that the annotation 352 references. For example, in FIG. 3C, the anchor is a bar 346 of the bar graph 324. Annotations 352, anchors 354, and cues 356 may each be searchable by users. In one embodiment, when a user selects an attribution derivation link 332 to access a different application 108, annotations 352 are not transferred between applications, but may be accessible whenever a card 302 is viewed via the cards application 102. Alternatively, annotations may be transferred between applications when the user selects an attribution link and/or creates a card. For example, annotations associated with an artifact created at an external application 108 may be transferred, via the cards API 112, as card data items to be associated with a card created from the artifact.

Users may also provide comments on a card or story. For example, when viewing a card, a user may be able to view comments left by previous viewers. Comments may be associated with a card ID and with the commenter's user ID.

Any of the described data items associated with stories (e.g., owner, number of cards, etc.) and cards (e.g., title, annotations, etc.) may be searchable by users. In this way, the cards application 102 and associated databases 116 may provide a convenient platform for accessing various analytical information, including information from a variety of applications. Various databases may also be suitable for indexing to provide improved search efficiency. This may be possible because related (and/or all) card data items may be stored in a database (e.g., database 116) associated with the cards application 102, rather than in disparate databases associated with various external applications. Thus, related (and/or all) card data items may be efficiently indexed and searched by the application.

Figure 4:
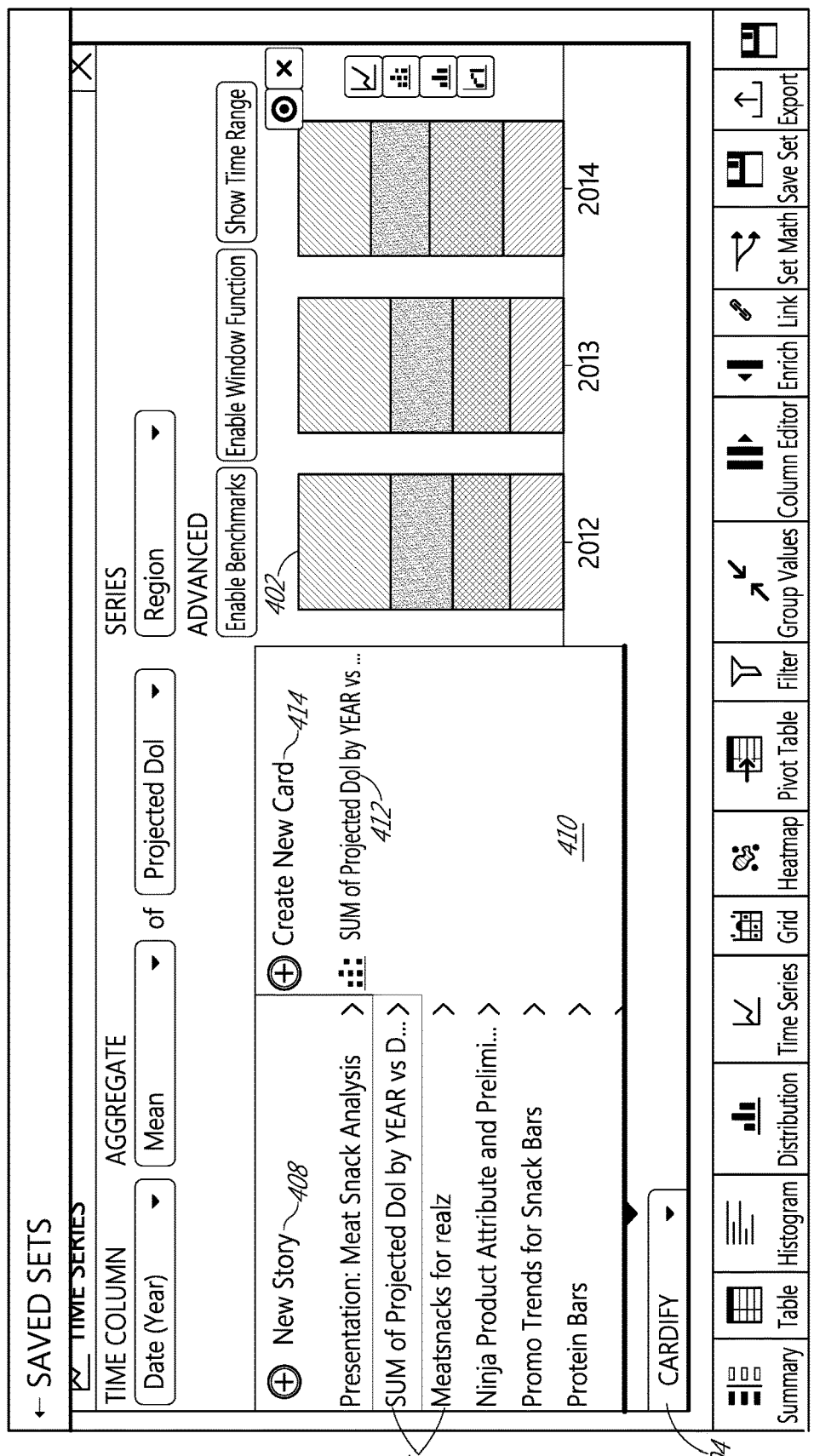
FIG. 4 illustrates an example interactive graphical user interface of an external application 108 that may communicate with the cards application 102 of FIG. 1.

FIG. 4 illustrates an example interactive graphical user interface of an example external application 108 that may communicate with the cards application 102 of FIG. 1, in accordance with some embodiments. As shown in FIG. 4, an application 400 may be suitable for creating and/or editing an artifact, such as a bar chart 402. The application 400 may be configured to communicate with the cards application 102 via the cards API 112. In an embodiment, the application 400 includes a "cardify" icon 404 which may facilitate communication with the cards application 102. A user may select the cardify icon 404 to open a list of stories 406 and/or an option to create a new story 408. The user may select a story 406 to view a card list 410 showing options to select a card 412 within the selected story 406 or create a new card 414 By selecting a story 406, 408 and/or a card 412, 414, the application 400 may implement the cards API 112 and transmit data indicative of the bar chart 402 created in the application 400 to the cards API 112. The cards API 112 may modify the bar chart 402 data to create a card for use by the cards application 102 and route the user to the cards application 102. The card created based on the bar chart 402 data may be added to the story 406, 408 selected by the user. Additionally, if a particular card 412 was selected, the card data items associated with the selected card 412 may be modified based on the created card 302. For example, a previous artifact at the selected card 412 may be replaced by the bar chart 402.

In an embodiment, the cards API 112 and/or cards application 102 may apply logic to data received from an external application 108. For example, a story may have settings that are applied to each card in the story. In the present example, a story may have an associated key that defines a coloring scheme for cards in the story. That is, each card may have a matching key that coordinates the color scheme of artifacts added to cards in the story. Logic may also be applied based on a type of card. For example, logic may be applied such that negative values of bar charts 324 are represented in red. Thus, any received data indicative of a bar chart 324 artifact may be adjusted to illustrate negative values in red. Such logic may be individualized for specific users, external applications 108, artifact type, etc.

Figure 5:
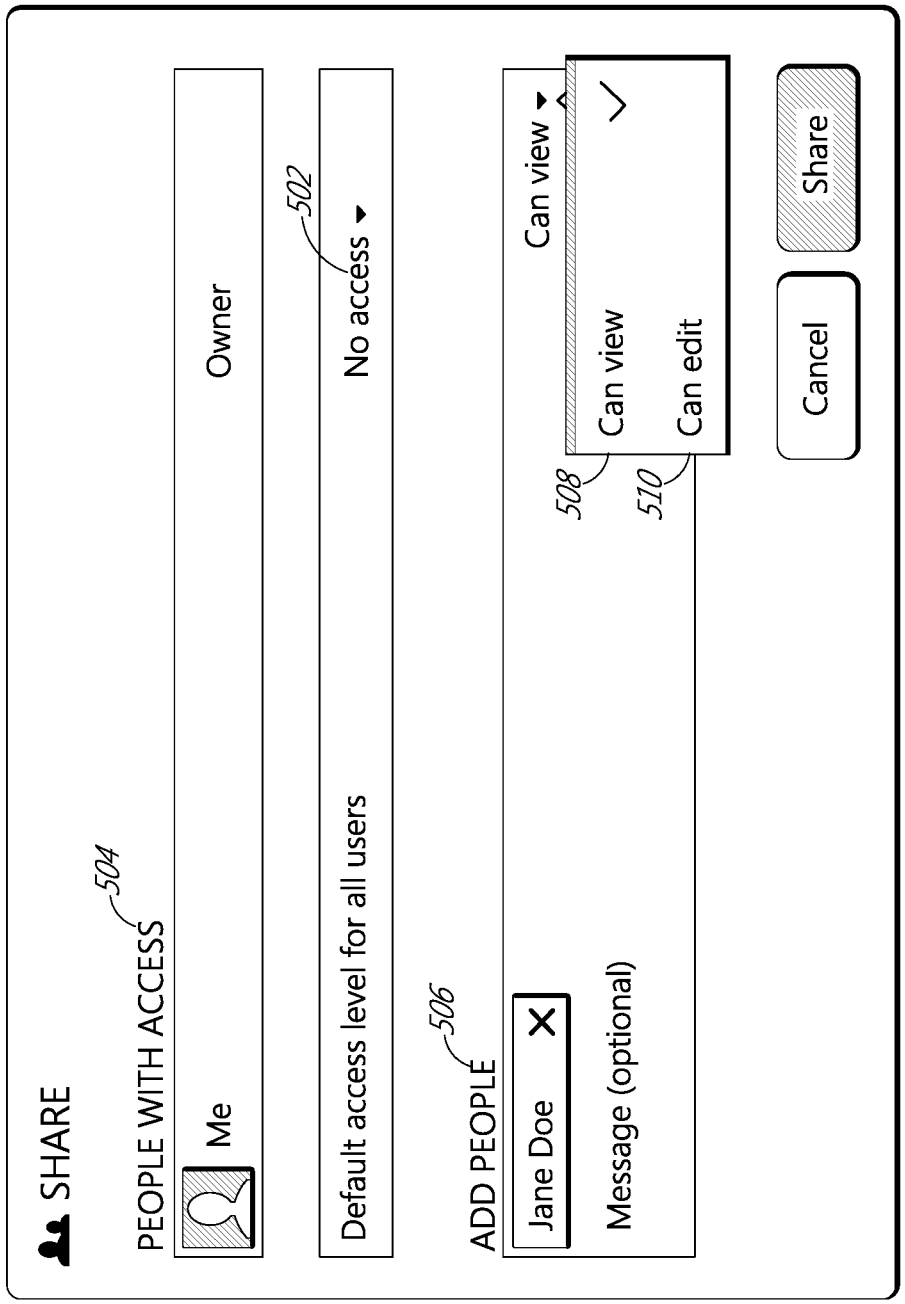
FIG. 5 illustrates an example interactive graphical user interface of the cards application for applying permissions.

FIG. 5 illustrates an example interactive graphical user interface of the cards application 102 for applying permissions, in accordance with some embodiments. A user may apply permissions (e.g., ACLs) to stories, cards, and/or any other individual or group of card data items of a card. For each ACL, the user may select an access level 502 for all users. For example, an ACL may allow all users to access a given card or restrict access to all users. Individual users may have access 504 to a given card, and other users may be added to an access list (e.g., by selection of user-selectable element 506). The level of access for each individual user may also be adjusted. For example, a user may only be allowed to view a card or may also be allowed to edit the card (e.g., by selection of user-selectable elements 508 and/or 510, respectively). In an embodiment, providing access to a user for a given story may allow the user to access all of the cards included in the story. Similarly, providing access for a given card may allow the user to access all of the card data items associated with the card. However, access for individual cards and/or card data items associated with a card (to the exclusion of others) may also be provided.

Figure 6A:
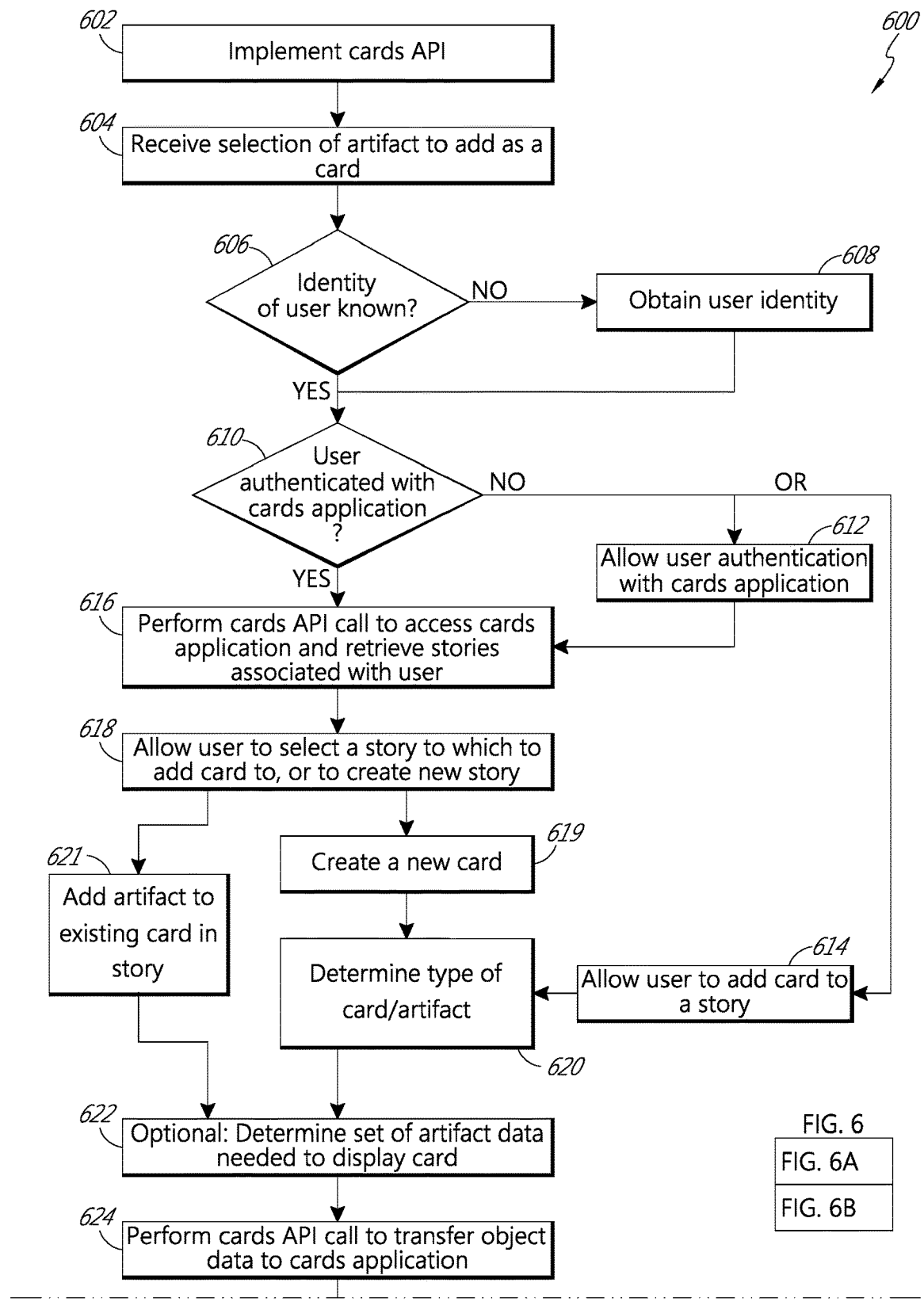
FIGS. 6A and 6B show a flowchart depicting an illustrative operation of an external application in which the external application interacts with a user and the cards application.
Figure 6B:
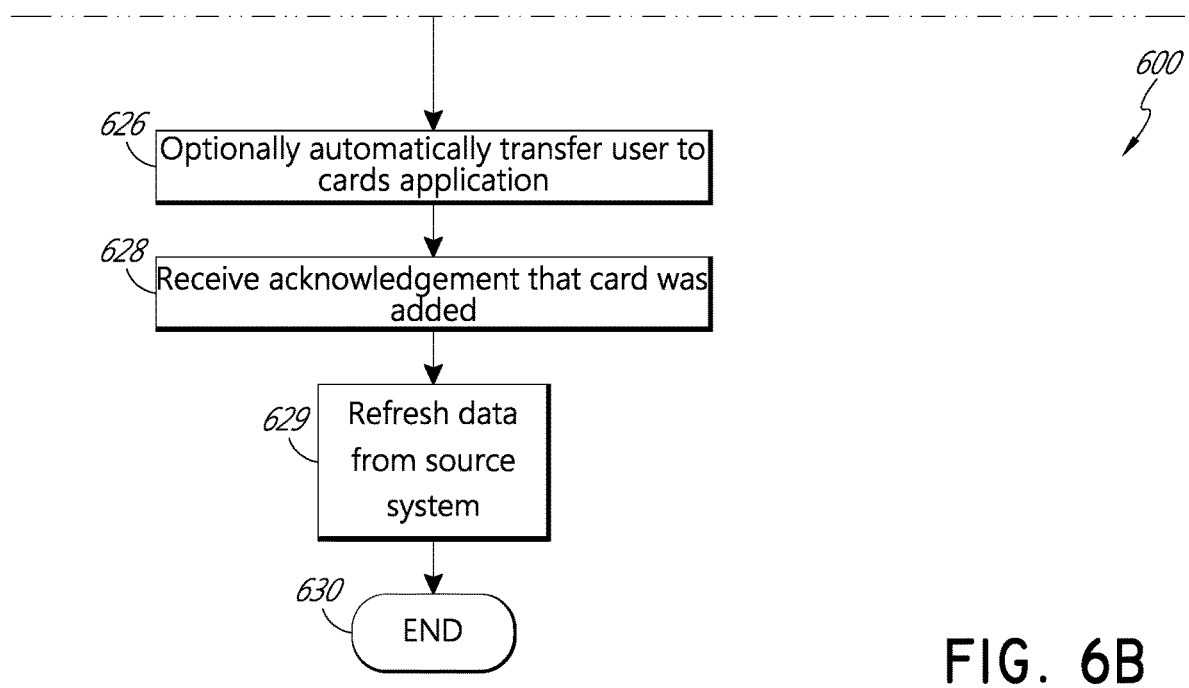

FIGS. 6A and 6B (herein collectively referred to as FIG. 6) show a flowchart depicting an illustrative operation of an external application in which the external application interacts with a user and the cards application 102. In various implementations, the described blocks of the flowchart of FIG. 6 may be performed in an order other than that specifically disclosed, or multiple blocks may be combined in a single block. The example blocks may be performed in serial, in parallel, or in some other manner. Further, blocks may be added to or removed from the disclosed example embodiments. In an implementation, blocks 622-629 may be performed in an order different from that shown in, and described in reference to, FIG. 6.

Additionally, as described above, and also below in reference to FIG. 7, each data item and property of cards/stories may individually be associated with access controls. Accordingly, while not explicitly depicted in FIG. 6, certain functions may depend on a user having access privileges to perform the action. For example, the user would only be able to select a story to add card data to if they have write access with respect to the card and the associated properties.

At block 602, the process 600 may involve implementing the cards API 112. For example, a user may select a link 404 at an external application 108 that implements the cards API 112.

The cards API 112 may include various standardized function calls that may be implemented in various applications including the external application 108. The external application 108 may call the standardized function calls of the cards API 112 to transfer data to the cards application 102 and other external applications (e.g., 104, 106) may perform the same actions by calling the standardized function calls. In this way, a variety of applications may communicate with the cards application 102 (e.g., send data to the cards application 102) via the cards API 112.

At block 604, the process 600 may involve receiving a selection of an artifact to add as a card. For example, the external application 108 may transmit data indicative of a selected artifact. The selection may be received at the cards API 112.

At optional block 606, a determination is made as to whether the identity of the user is known. For example, if a user has previously implemented the cards API 112, the identity of the user may be known. In an embodiment, if the user's identity is known by the external application, information regarding the user's identity may be provided, via the cards API 112, to the cards application 102. If the identity of the user is not known, then at block 608, the identity of the user may be determined by the external application. For example, the user may log into the external application and/or otherwise provide identifying information to the external application, which may be provided to the cards application 102 via the cards API 112.

At optional block 610, a determination is made as to whether the user is authenticated with the cards application 102. Such a determination may be made based on the identifying information described above. Authentication of the user is useful, as described below, to allow the user to easily add to, and interact with, existing cards and/or stories associated with the user in the cards application 102. For example, if there are permissions associated with the cards application 102 and/or a particular card or story, user authentication may be required to allow the user to add a card to an existing story. However, in an embodiment, user authentication may not be required. If the user is not authenticated with the cards application 102, then at block 612, the user may be allowed to authenticate with the cards application 102. For example, the user may register an account with the cards application 102. Alternatively, if the user is not authenticated with the cards application 102, then at block 614 the user may be allowed to add a card to a story (e.g., a new or existing story). That is, the user may be able to create a new story that does not have associated permissions.

At block 616, the process 600 may involve performing a call to the cards API 112 to access the cards application 102 and retrieve stories associated with the user. For example, the cards application 102 may determine which stories the user has permission to access or that the user has previously worked on.

At block 618, the process 600 may involve allowing the user to select a story (e.g., a story which the user has write access to) to which the card will be added, or to create a new story to which the card may be added. For example, the selected story may be one of the stories retrieved by the cards application 102. The selected story may alternatively be a new story. At block 618, the user, for example, may select a story he or she has write access to, or may create a new story.

At block 619, the user may select to create a new card, which may be added to an existing story or a new story.

At block 620, the process 600 may involve determining a card and/or artifact type. For example, if the artifact is a bar chart, the external application 108 may determine that it is a bar chart type. The external application 108 may then transmit information indicative of the bar chart type to the cards API 112. The external application 108 may also transmit data items associated with bar charts, such as a key for labeling the bars in the bar chart. Further, in an implementation, the user may select the card type (e.g., chart card, image card, etc.)

Alternatively, at block 621, the user may select to add an artifact to an existing card in a story. In an implementation, the user may select the artifact/card type, or the system may determine the artifact/card type by virtue of the type of data of the artifact or the type of card the artifact is being added to.

Thus, for example, the user may either select an existing card to add to (e.g., the card being added could be the first data artifact added, or could be accretive to an existing data artifact within an existing card) or create a new card, as described above.

At block 622, the process 600 may optionally involve determining a set of artifact data needed for displaying the card 302. For example, not all of the data indicative of the artifact transmitted to the cards API 112 may be necessary for displaying data representative of the artifact in the cards application 102. For instance, the external application 108 may use such data for editing and/or other capabilities involving the artifact that are not used by the cards application 102. As such, the cards application 108 may trim excess data from the artifact for improved efficiency at the cards application 102. In an implementation, the user may provide the data needed to create the card, for example, by uploading a static tabular data file, an image, or the like (e.g., where the data input is the user's local machine and the derivation link (as described below in reference to FIG. 7) is a file, stored in the cards database).

At block 624, the process 600 may involve performing a cards API 112 call to transfer object data to the cards application 102. For example, the external application 108 may perform the call to the cards API 112.

At block 626, the process 600 may optionally involve automatically transferring the user (i.e., user device 110) to the cards application 102. For example, if the user was accessing the external application 108, the user may be transferred to the cards application 102 to view the card.

At block 628, the process 600 may involve receiving an acknowledgement that the card was added. For example, the external application 108 receives an acknowledgement from the cards application 102, which acknowledgement may be provided to the user.

At block 629, the process 600 may involve refreshing the data of cards from data sources associated with the cards. As described herein, cards are associated with data and a source for the data. Cards may further be associated with a frequency that the data in the card should be updated or refreshed. Thus, in block 629, the system may make a request for updated data (e.g., via an API call of the cards API 112, or by a request to a local data source), may receive the updated data, and may update the card. As described above in reference to FIG. 1, such refreshing may be automatic or user initiated (e.g., the user may indicate the data is to be updated immediately via a user interface, such as a web interface, by selecting a "refresh" button). In an implementation, the system or the user may indicate a frequency or a schedule for updating the data (e.g., the user may input a frequency or schedule via a user interface, such as a web interface). Such frequency of updating may be, for example, never, daily, weekly, or some other frequency.

At block 630, the process 600 ends.

Figure 7A:
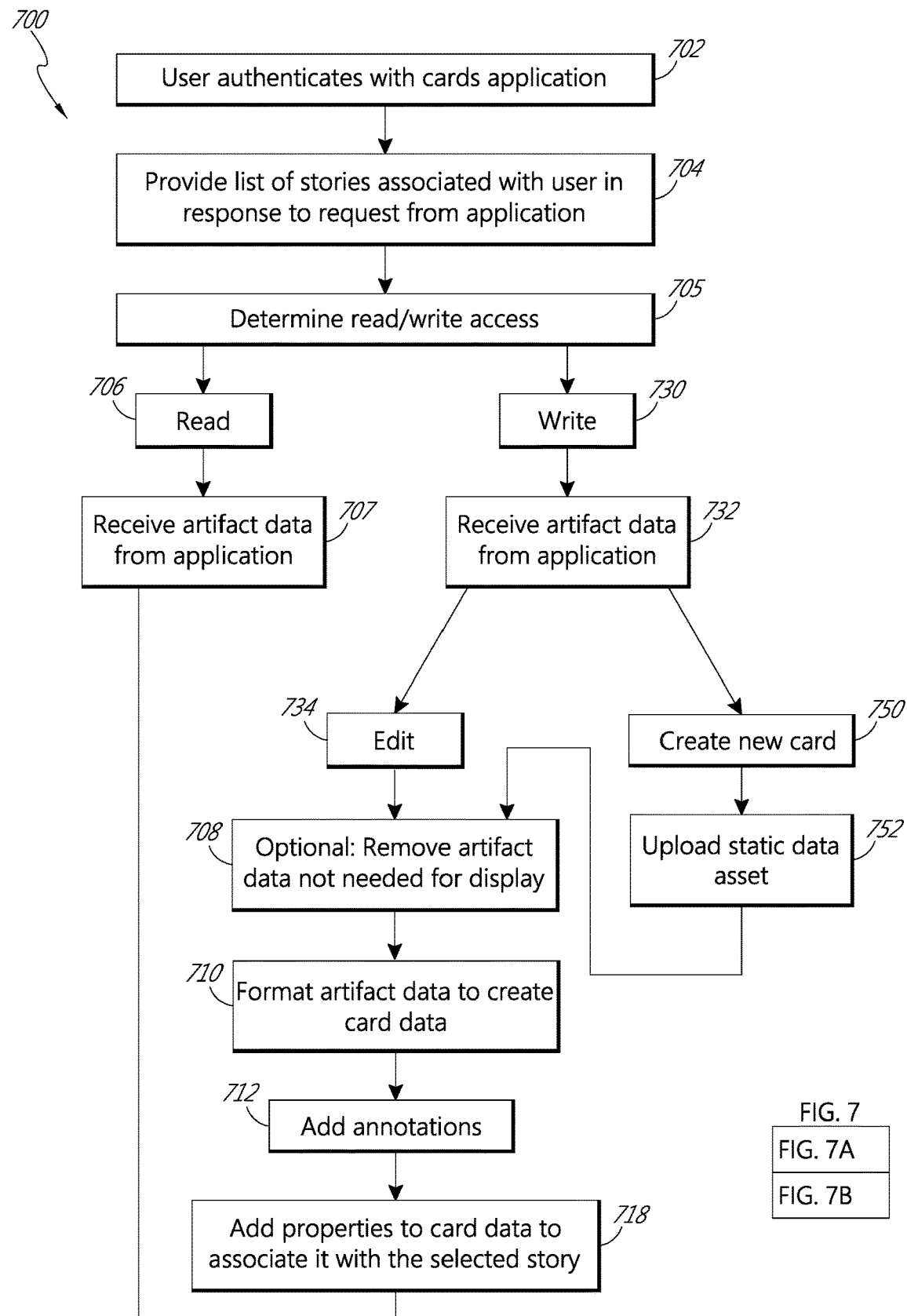
FIGS. 7A and 7B show a flowchart depicting an illustrative operation of the cards application in which the cards application interacts with a user and the external application of FIGS. 6A and 6B.
Figure 7B:
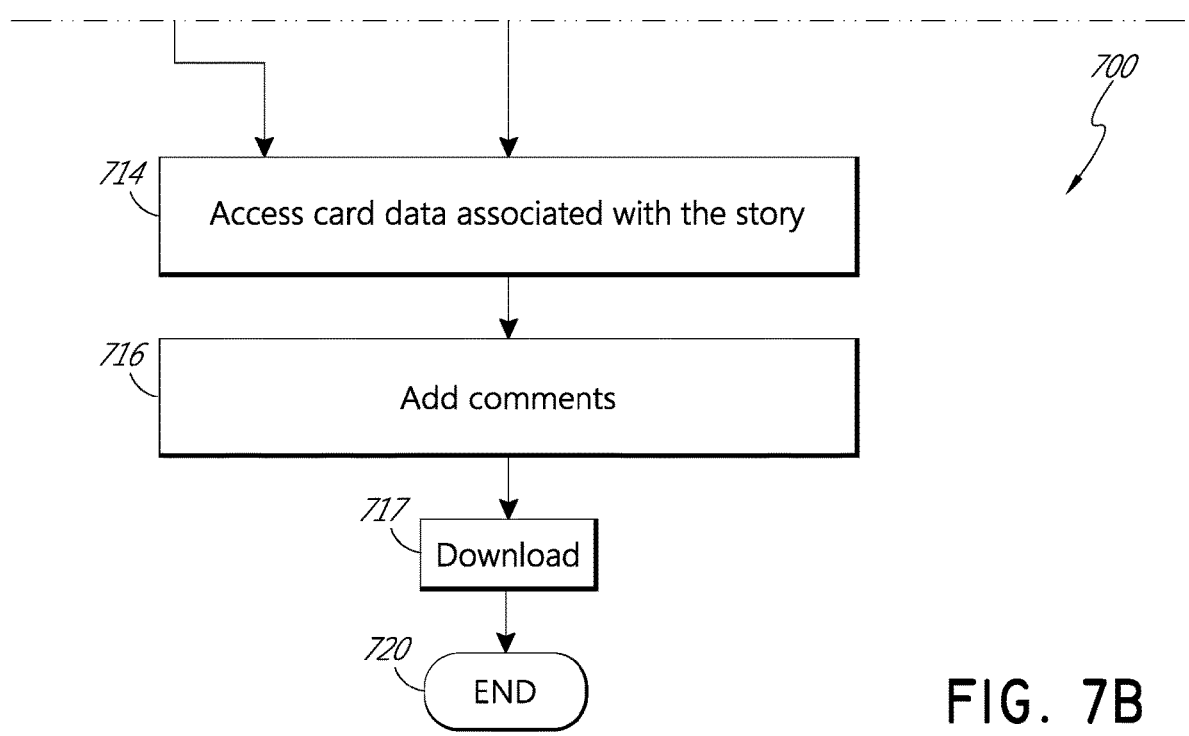

FIGS. 7A and 7B (herein collectively referred to as FIG. 7) show a flowchart depicting an illustrative operation of the cards application 102 in which the cards application 102 interacts with a user and the external application of FIG. 6, in accordance with some embodiments. In various implementations, the described blocks of the flowchart of FIG. 7 may be performed in an order other than that specifically disclosed, or multiple blocks may be combined in a single block. The example blocks may be performed in serial, in parallel, or in some other manner. Further, blocks may be added to or removed from the disclosed example embodiments.

Additionally, in various implementations, access controls (e.g., ACLs) may be associated with every item of data of a card/story, every property of a card/story. Accordingly, a user's access to card/story data may be finely defined and controlled. For example, a user may have read access to a story and simultaneously have partial write access to certain cards of the story. In another example, a user could have read/write control over a title of a card, but not design and visualization of the card, as each of these items comprises a different property of the card. In another example, a card ID can have a different access level than properties of the card, or they may all have the same access levels. Accordingly, ACLs may be defined for every item of data, every property every property type, etc., and for each user, user group, type of user, etc. Access controls, as described below in reference to FIG. 7 and elsewhere herein, may be implemented in association with API calls that grab the card/artifact data, such that user actions (and data viewable by users) are restricted in accordance with their permission levels.

At block 702, the process 700 may involve the user authenticating with the cards application 302. For example, the cards application 102 may store user information in a database 116. The user information may be indicative of stories and/or cards associated with the user, including user permissions for accessing stories and/or cards.

At block 704, the process 700 may involve providing a list of stories associated with the user in response to a request from an external application 108. For example, the cards application may provide any stories associated with the user based on information stored in the database 116. The stories may be provided in response to the request from the external application 108 at block 616 of FIG. 6.

At block 705, the process 700 may involve determine assess permissions of the user. For example, the system may determine that the user has one or more of read or write permission with respect to a card, story, etc.

If the user has read access, the process 700 may continue down the path indicated by block 706. As described above, read access may apply at the property level, the card level, the story level, etc. Accordingly, read access may mean that the user can only read the story, and that they cannot perform any other action beyond interacting with the read only graphical interface of the card. However, the user may still be able to comment on a story/card. Other combinations of access privileges may also be implemented.

At block 707, the process 700 may involve receiving artifact and/or card data from the external application 108. For example, the cards application 102 and/or the cards API 112 may receive data indicative of the artifact and/or card.

The received data may be data transferred by the external application 108 at block 624 of FIG. 6.

At block 714, the process 700 may involve accessing card data associated with the story. Further, at block 714, the system may display the card data to the user, as the user has read access permissions for the data.

At block 716, the process 700 may involve adding comments to the card. For example, users may add comments to a card.

At block 717, the process 700 may involve downloading artifact/card data.

The process 700 ends at block 720.

As mentioned above, in various embodiments, one or more of blocks 707, 714, 716, 717, or 720 may be optional, and/or these blocks may be performed in an order different from that shown in, and described in reference to, FIG. 7 above.

Returning to block 705, if the user has write access, the process 700 may continue down the path indicated by block 730. As described above, write access may apply at the property level, the card level, the story level, etc. As user herein, the term "write" access generally includes read access also. Accordingly, write access may mean that the user can read the story, edit the story (e.g., reorder cards, add cards, etc.), etc. Other combinations of access privileges may also be implemented.

At block 732, as described above in reference to block 707, the process 700 may involve receiving artifact and/or card data from the external application 108. For example, the cards application 102 and/or the cards API 112 may receive data indicative of the artifact and/or card. The received data may be data transferred by the external application 108 at block 624 of FIG. 6.

If the user indicates that a card/story is to be edited (e.g., by adding or changing data and artifacts, adding or changing cards, rearranging cards, editing the content of cards, etc.), the process 700 proceeds to block 734.

At block 708, the process 700 may optionally involve removing artifact data not needed for display. As discussed above, the external application 108 may provide data which the external application 108 uses in creating the artifact but may not be necessary for displaying the artifact in a card form. The cards application 102 and/or cards API 112 may therefore trim the excessive data for improved efficiency.

At block 710, the process 700 may involve formatting the received artifact data to create card 302 data. For example, the cards application 102 may require a slightly different format than that used by the external application 108.

At block 712, the process 700 may involve adding annotations to the card. For example, a user and/or the cards application 102 may add annotations to the card. Annotations may be added to a card 302 to communicate information to users about the card in general and/or about specific parts of the card. Annotations may also be received from the external application 108. For example, the external application 108 may transmit annotations associated with the artifact used in creating the card. Such annotations may be added to the card.

At block 718, the process 700 may involve adding properties to the card data to associate the card with the selected story. For example, the user may select a story to associate the card with, and the card may be embedded with a card data item which creates a link between the card and the selected story.

At block 714, as described above, the process 700 may involve accessing card data associated with the story. The cards application 102 may associate certain data with each card of a given story. For example, each card in a story may include as a property the title of the story. Further, at block 714, the system may display the card data to the user.

At block 716, as described above, the process 700 may involve adding comments to the card. For example, users may add comments to a card.

At block 717, as described above, the process 700 may involve downloading artifact/card data.

The process 700 ends at block 720.

As mentioned above, in various embodiments, one or more of blocks 708, 710, 712, 718, 714, 716, 717, or 720 may be optional, and/or these blocks may be performed in an order different from that shown in, and described in reference to, FIG. 7 above.

Returning to block 732, if the user indicates that a new card is to be added, the process 700 proceeds to block 752.

At block 752, the user may optionally upload a static data asset (e.g., locally provide a data file, such as a CSV file, image file, etc.) as described above.

The process 700 then proceeds as generally described above in reference to blocks 708, 710, 712, 718, 714, 716, 717, or 720 following the edit block 734.

Accordingly, the process 700 illustrates that certain blocks may be executed depending on the access permissions and indicated actions of the user. Further, in various implementations, various functionality of the blocks may vary depending on the access permission level of the user.

Figure 8:
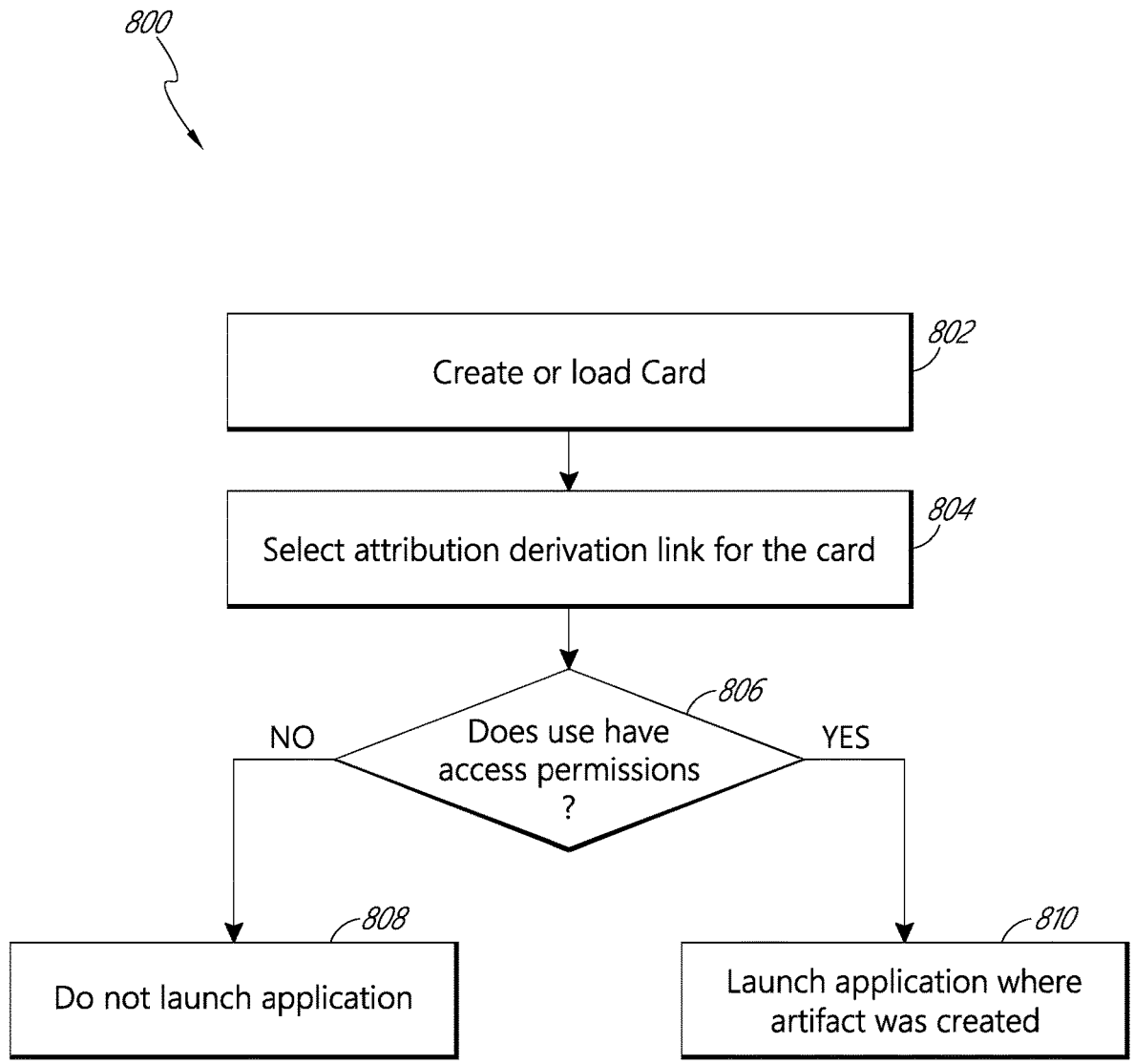
FIG. 8 is a flowchart depicting an illustrative operation of the cards application for determining whether a user has access permissions.

FIG. 8 is a flowchart depicting an illustrative operation of the cards application 102 for determining whether a user has access permissions, in accordance with some embodiments. At block 802, the process 800 may involve creating or loading card data associated with a card 302. For example, a card may be created and/or edited at the cards application 102.

At block 804, the process 800 may involve selecting an attribution derivation link 332 for the card 302. For example, the attribution derivation link 332 may be configured to link the cards application 102 to an external application 108. The attribution derivation link 332 may transfer the user device 110 to the external application 108 to view the artifact used in creating the card 302.

At block 806, a determination is made as to whether the user has access permissions for the attribution derivation link 332. For example, only one or more users of a group of users (e.g., the user who created the card) may be allowed to access the artifact used in creating the card 302. Other permissions may also be associated with other card data items associated with a card and/or of the card itself. If the user does not have access permissions, then at block 808, the external application 108 may not be launched and/or the user may not be transferred to the external application 108. If the user does have access permissions, then at block 810, the process 800 may involve launching the external application 108 to allow the user to access the artifact used in creating the card 302. A similar determination may be made for other card data items. For example, if a user attempts to view a particular card data item, a determination may be made as to whether the user has access permissions for the selected item.

In an embodiment, the cards application 102 may be configured to track viewing history of consumers. For example, when a user views a card and/or story, the cards application 102 may record data in the database 116 indicating the viewing by the user. The recorded data may not only indicate the user's identity, but may also indicate any groups associated with the user. For example, if a user from a marketing department group views a card, a number of views for that card from the marketing department group may automatically increment. This information may be viewed, for example, by an administrator and/or other users. This information may be useful in a variety of ways. For example, such data may indicate that a particular group is focusing too heavily on a particular card, author, type of card, etc. The information may also be useful in tracking what kinds of information interests a particular group for directing further analytics.

Cards 302 may have multiple "frames." A frame may be created by a user to focus on a single insight which may be derived from the data shown in the card 302 and may comprise a combination of textual and graphical cues. For example, a user may create a first frame that, when selected, highlights a portion of a card 302 to emphasize the highlighted portion. An individual frame may also have associated annotations.

The systems and methods described herein may provide several benefits. For example, the systems and methods described herein may allow users to more easily gather and aggregate data from various different sources while maintaining an ability to access the various sources. This may be possible through use of a flexible API that is configured to facilitate communication between multiple applications. The systems and methods described herein may also allow users to quickly and efficiently search, locate, and access various analytical data. This may be possible because related (and/or all) card data items may be stored in a database (e.g., database 116) associated with the cards application 102, rather than in disparate databases associated with various external applications. Thus, related (and/or all) card data items may be efficiently indexed and searched by the application. Moreover, the systems and methods described herein provide an ability to effectively organize data for consumption, thus further improving accessibility of desired information.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 9 is a block diagram that illustrates a computer system 900 upon which various embodiments may be implemented. For example, any of the computing devices discussed herein may include some or all of the components and/or functionality of the computer system 900.

Computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions. Main memory 906 may also store cached data, such as zoom levels and maximum and minimum sensor values at each zoom level.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions. For example, the storage device 910 may store measurement data obtained from a plurality of sensors.

Computer system 900 may be coupled via bus 902 to a display 912, such as a cathode ray tube (CRT) or LCD display (or touch screen), for displaying information to a computer user. For example, the display 912 can be used to display any of the user interfaces described herein with respect to FIGS. 1 through 11D. An input device 914, including alphanumeric and other keys, is coupled to bus 902 for communicating information and command selections to processor 904. Another type of user input device is cursor control 416, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may retrieve and execute the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicate with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system configured to access and display data from a source software application, the computing system comprising:
   one or more hardware computer processors configured to execute program instructions to cause the computing system to:
      determine an interactive graphical unit to be generated for display in an interactive user interface on a user computing device;
      perform an application programming interface ("API") call, via an API, to a source software application to initiate transfer of a first data set from the source software application to a target software application;
      receive, from the source software application via the API, the first data set;
      access user interface data from a database, the user interface data useable for rendering the interactive user interface on the user computing device, the interactive user interface including the interactive graphical unit displaying at least a portion of the first data set according to one or more display parameters of the user interface data;
      in response to determining that a user is allowed to modify the interactive graphical unit, generate updated user interface data based on updating the one or more display parameters of the user interface data to reflect a user modification of the interactive graphical unit;
      store the updated user interface data in the database, the updated user interface data accessible from the database for rendering an updated interactive graphical unit according to the updated one or more display parameters;
      in response to a user selection to access the first data set, determine whether the user is granted with access permission to the first data set; and
      in response to determining that the user is granted with access permission, allow the user to access the first data set.

2. The computing system of claim 1, wherein the one or more hardware computer processors is further configured to execute the program instructions to cause the computing system to:
   in response to determining that the user is granted with access permission:
      initiate a call to the source software application, via the API, to cause the source software application to launch with a pre-populated display of the first data set on the user computing device; and
      update the first data set in response to one or more user modifications of the first data set; and
   in response to determining that the user is not granted with access permission, not initiate a call to the source software application.

3. The computing system of claim 1, wherein the one or more hardware computer processors is further configured to execute the program instructions to cause the computing system to:
   format the first data set for the interactive graphical unit, wherein formatting the first data set comprises modifying the first data set to a form that is suitable for use by the target software application.

4. The computing system of claim 3, wherein modifying the first data set comprises removing data from the first data set that is not necessary for display by the interactive graphical unit.

5. The computing system of claim 1, wherein the one or more hardware computer processors is further configured to execute the program instructions to cause the computing system to:
receive user identifying information from the source software application; and
transmit a list of group identifiers associated with the user to the source software application in response to receiving the user identifying information, the group identifiers identifying groups of interactive graphical units to which the interactive graphical unit may be added.

6. The computing system of claim 1, wherein the one or more hardware computer processors is further configured to execute the program instructions to cause the computing system to:
associate the interactive graphical unit with a unique identifier.

7. The computing system of claim 6, wherein the unique identifier comprises at least one of: an access control list ("ACL"), a title, an author, a date of creation, a type of data, or a source of data.

8. The computing system of claim 6, wherein the one or more hardware computer processors is further configured to execute the program instructions to cause the computing system to:
modify the unique identifier based on at least a user input.

9. A computing system configured to transmit data to a target software application, the computing system comprising:
one or more hardware computer processors configured to execute program instructions to cause the computing system to:
receive an application programming interface ("API") call, via an API, from a first target software application to initiate transfer of a first data set from a source software application to the first target software application, the first data set configured for use in formatting the first data set and generating a first interactive user interface on a user computing device, the first interactive user interface including an interactive graphical unit displaying the formatted first data set;
transfer the first data set to the first target software application via the API;
access user interface data from a database, the user interface data useable for rendering a second user interface on the user computing device, the second user interface providing the first data set according to one or more display parameters of the user interface data;
cause display of the second user interface on the user computing device;
in response to determining that a user is allowed to modify the interactive graphical unit, generate updated user interface data based on updating the one or more display parameters of the user interface data to reflect a user modification of the interactive graphical unit;
store the updated user interface data in the database, the updated user interface data accessible from the database for rendering an updated interactive graphical unit according to the updated one or more display parameters;
in response to receiving a selection from the user to access the first data set, determine whether or not the user is granted with access permission to the first data set; and
in response to determining that the user is granted with access permission, allow the user to access the first data set.

10. The computing system of claim 9, wherein the one or more hardware computer processors is further configured to execute the program instructions to cause the computing system to:
in response to determining that the user is granted with access permission:
initiate a call to the source software application, via the API, to cause the source software application to launch with a pre-populated display of the first data set on the user computing device; and
update the first data set in response to one or more user modifications of the first data set; and
in response to determining that the user is not granted with access permission, not initiate a call to the source software application.

11. The computing system of claim 9, wherein the one or more hardware computer processors is further configured to execute the program instructions to cause the computing system to:
determine a set of the first data set needed to display the interactive graphical unit.

12. The computing system of claim 9, wherein the one or more hardware computer processors is further configured to execute the program instructions to:
cause the computing system to receive identification information for the user.

13. The computing system of claim 12, wherein the one or more hardware computer processors is further configured to execute the program instructions to:
cause the computing system to transmit a request for a list of group identifiers associated with the user to the first target software application; and
receive the list of group identifiers from the first target software application.

14. The computing system of claim 13, wherein the one or more hardware computer processors is further configured to execute the program instructions to:
cause the computing system to receive a selection of a group identifier from the user; and
transmit the selected group identifier, via the API, to the first target software application.

15. The computing system of claim 9, wherein the one or more hardware computer processors is further configured to execute the program instructions to:
cause the computing system to receive acknowledgement from the first target software application that the interactive graphical unit was created.

16. The computing system of claim 9, wherein the first target software application comprises a card software application.

17. The computing system of claim 9, wherein the source software application comprises an external application.

18. The computing system of claim 9, wherein communication between the source software application and the first target software application via the API is bidirectional.

19. The computing system of claim 9, wherein the interactive graphical unit comprises an atomic unit of displayable content.

20. A computer-implemented method comprising:
- determining an interactive graphical unit to be generated for display in an interactive user interface on a user computing device;
- performing an application programming interface ("API") call, via an API, to a source software application to initiate transfer of a first data set from the source software application to a target software application;
- receiving, from the source software application via the API, the first data set;
- accessing user interface data from a database, the user interface data useable for rendering the interactive user interface on the user computing device, the interactive user interface including the interactive graphical unit displaying at least a portion of the first data set according to one or more display parameters of the user interface data;
- in response to determining that a user is allowed to modify the interactive graphical unit, generating updated user interface data based on updating the one or more display parameters of the user interface data to reflect a user modification of the interactive graphical unit;
- storing the updated user interface data in the database, the updated user interface data accessible from the database for rendering an updated interactive graphical unit according to the updated one or more display parameters;
- in response to a user selection to access the first data set, determining whether the user is granted with access permission to the first data set; and
- in response to determining that the user is granted with access permission, allowing the user to access the first data set.

* * * * *